(12) United States Patent
Obara et al.

(10) Patent No.: US 6,366,702 B1
(45) Date of Patent: Apr. 2, 2002

(54) METHOD OF AND APPARATUS FOR IMAGE PROCESSING

(75) Inventors: Mitsuru Obara, Toyohashi; Atsushi Ishikawa, Okazaki; Kenichi Sawada, Toyohashi, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/103,308

(22) Filed: Jun. 23, 1998

(30) Foreign Application Priority Data

| Jun. 24, 1997 | (JP) | ............................................. 9-166765 |
| May 21, 1998 | (JP) | ........................................ 10-139392 |
| May 21, 1998 | (JP) | ........................................ 10-139393 |
| May 21, 1998 | (JP) | ........................................ 10-139394 |

(51) Int. Cl.$^7$ ............................ G06K 9/36; G06K 9/00; H04N 1/41
(52) U.S. Cl. ........................ 382/237; 382/166; 358/428
(58) Field of Search .................. 382/237, 232, 382/166; 358/1.15, 1.16, 261.2, 298, 428, 404, 426, 468, 500, 510; 395/109

(56) References Cited

U.S. PATENT DOCUMENTS

| 4,941,057 A | | 7/1990 | Lehmbeck et al. ........... 358/443 |
| 5,128,748 A | | 7/1992 | Murakami et al. ........... 358/500 |
| 5,130,820 A | * | 7/1992 | Hirota ......................... 358/447 |
| 5,307,177 A | | 4/1994 | Shibata et al. ............... 358/430 |
| 5,768,507 A | * | 6/1998 | Eglit ........................... 709/202 |
| 5,838,455 A | | 11/1998 | Imaizumi et al. ........... 358/298 |

FOREIGN PATENT DOCUMENTS

| JP | 63-155972 | 6/1988 | ............ H04N/7/13 |
| JP | 2-256365 | 10/1990 | ............ H04N/1/00 |
| JP | 4-185172 | 7/1992 | .......... H04N/1/415 |

* cited by examiner

*Primary Examiner*—Wenpeng Chen
(74) *Attorney, Agent, or Firm*—Sidley Austin Brown & Wood

(57) ABSTRACT

The method and apparatus particularly adapted for reducing the storage capacity of line memories needed for temporarily storing image data for lines until image data for the last line is obtained in digital filtering. Inputted image data are divided into a plurality of blocks, each of which consists of image data obtained from n pixels. The integer n may assume a value of 8, 16, 32, etc. The constituents of one block after another are compressed such that image data consisting of 8 bits per pixel are converted into encoded data consisting of 2 bits per pixel. Data on a dynamic range and an average value for each block are added as a headder to the encoded data. Compressed image data are taken out of a buffer memory after being temporarily stored therein and, together with or separately from compressed image data newly outputted from a compression unit, subjected to image processing such as MTF correction in an arithmetic unit. Image processing to be carried out in the arithmetic unit normally includes expansion and correction to be carried out independently of or simultaneously with each other.

36 Claims, 31 Drawing Sheets

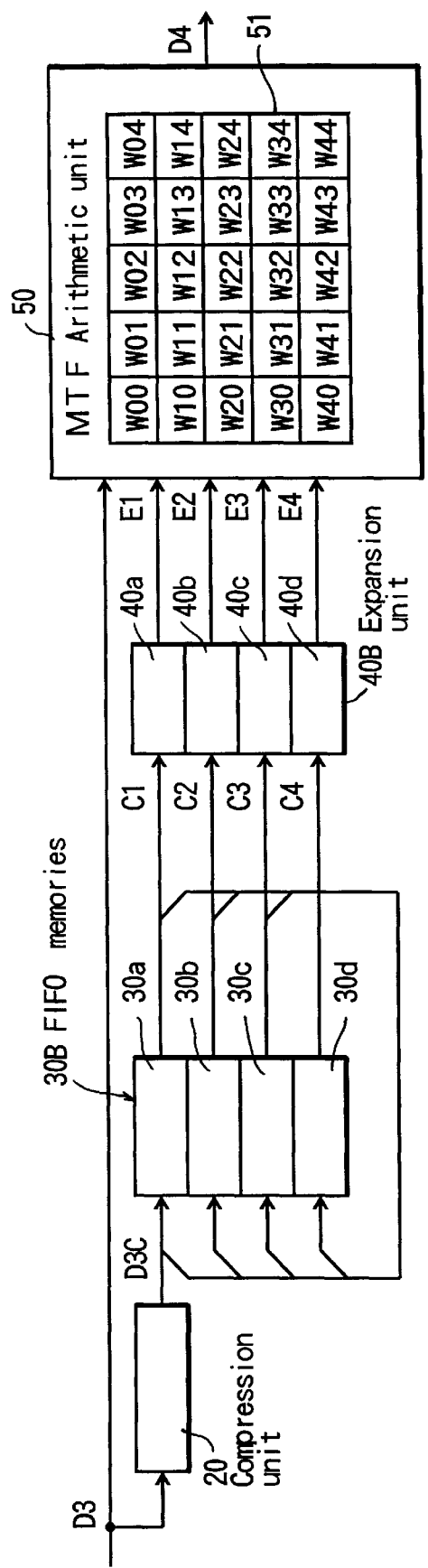

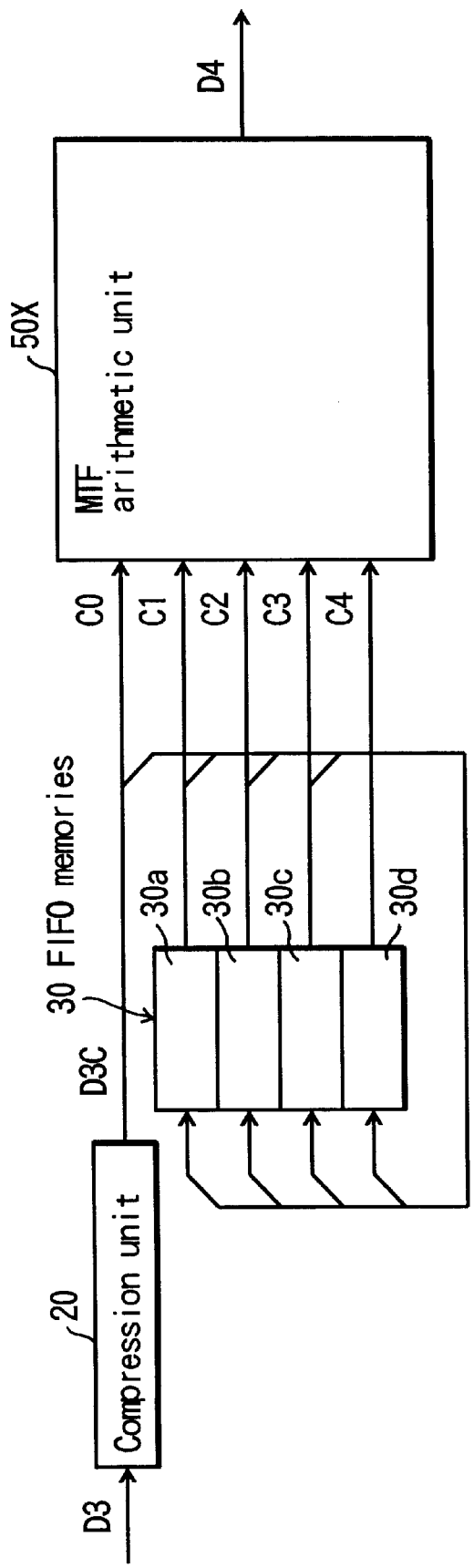

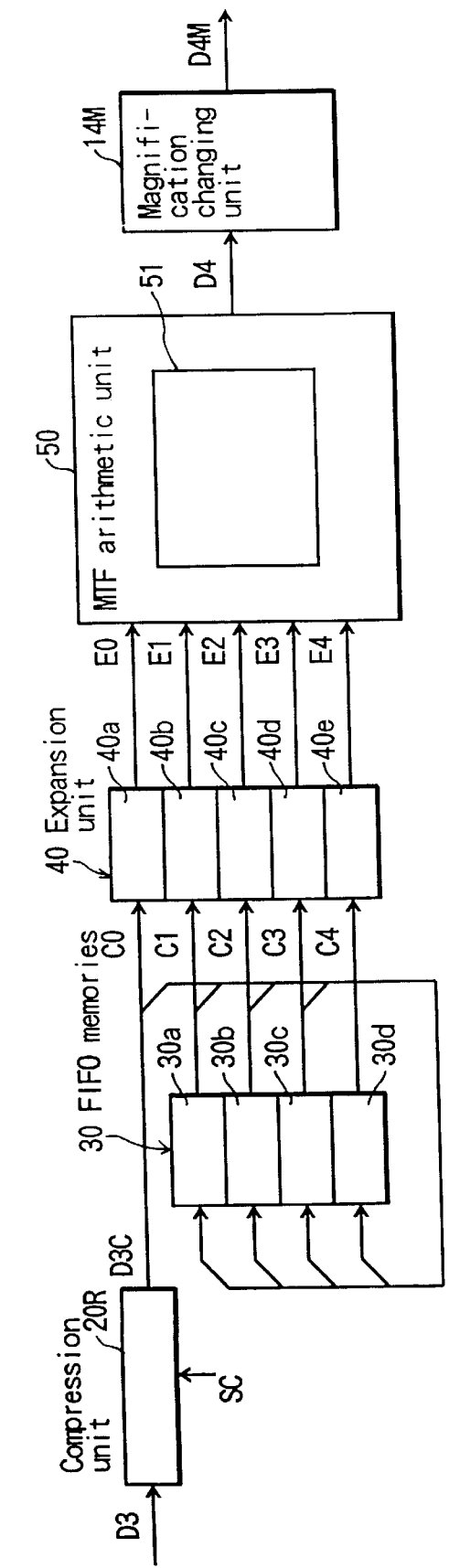

Fig. 28 (A)

| Storage capacity | Compressibility to be selected | |
|---|---|---|
| | A4Y (Document A) | A4T (Document B) |
| 2560byte | 5/16 (2192byte) | 1/2 (2481byte) |
| 3072byte | 3/8 (2631byte) | 1/2 (2481byte) |
| 5120byte | 1/2 (3508byte) | 1 (4961byte) |

Fig. 28 (B)

| Storage capacity | Compressibility to be selected | | |
|---|---|---|---|
| | M = 1 | M = 1/2 | M = 1/4 |
| 2560byte | 5/16 (2192byte) | 1/2 (1754byte) | 1 (1754byte) |
| 3072byte | 3/8 (2631byte) | 1/2 (1754byte) | 1 (1754byte) |
| 5120byte | 1/2 (3508byte) | 1 (3507byte) | 1 (1754byte) |

Fig. 28 (C)

| Storage capacity | Compressibility to be selected | | |
|---|---|---|---|
| | M = 1 | M = 2 | M = 4 |
| 2560byte | 5/16 (2192byte) | 1/2 (1754byte) | 1 (1754byte) |
| 3072byte | 3/8 (2631byte) | 1/2 (1754byte) | 1 (1754byte) |
| 5120byte | 1/2 (3508byte) | 1 (3507byte) | 1 (1754byte) |

METHOD OF AND APPARATUS FOR IMAGE PROCESSING

BACKGROUND OF THE INVENTION

This application is based on Japanese Patent Application No. 09-166765 filed on Jun. 24, 1997, No. 10-139392 filed on May 21, 1998, No. 10-139393 filed on May 21, 1998, and No. 10-139394 filed on May 21, 1998, the contents of which are incorporated herein by reference.

1. Field of the Invention

This invention relates to a method of and an apparatus for image processing in which serially fed image data are subjected to digital filtering. The invention is applicable to a digital copying machine or an image-reproducing system which is a combination of a scanner and a printer.

2. Description of the Prior Art

Digital copying machines have heretofore been proposed where image data obtained from the imaging of a document are subjected to γ transform, magnification change, correction of a modulation transfer function (MTF) and formation of a binary image. Correction of the MTF aims at improving picture quality and ordinarily includes two-dimensional digital filtering such as edge sharpening.

With the digital copying machine, the document is scanned in order of successive lines. In concert with the progress of scanning, image data are serially transmitted from each pixel. In order to subject all the image data to two-dimensional digital filtering at a time, image data for preceding lines have to be temporarily stored until image data for the last line is obtained.

In order to effect edge sharpening by means of, e.g., a Laplacian filter which is the size of 5×5, it has been conventional practice in the past to use four line memories for temporarily storing image data for four lines. These image data are taken out of the line memories in concert with the progress of scanning of the fifth line. Image data transmitted by pixels located at the same locations in the five lines are fed to a filter circuit at a time.

Heretofore, as the number of bits per pixel is increased and as the higher resolution is required for reading an image, a stringent necessity for larger capacity has come upon the line memories and has resulted in high costs.

Let it be assumed that image data consist of 8 bits (i.e. 256 scales) per pixel and that a document printed or handwritten on a sheet of paper parallel with the longer sides of the paper which is the size of DIN A4 is read with a resolution of 600 dpi. Then the quantity of data per line amounts to about 8 kilobytes. This means that a storage capacity of 32 kilobytes in total is needed for four lines. Large-capacity memories make it difficult to be mounted on a single substrate together with other data processing circuits.

SUMMARY OF THE INVENTION

The primary object of the present invention is to provide an improved method and apparatus for processing image data.

Another object of the present invention is to provide a method and apparatus for processing image data which is capable of reducing a capacity of memory for synchronizing a plurality of lines of image data.

To achieve at least one of the above mentioned objects, the method for processing image data of one aspect of the present invention comprises the steps of (a) synchronizing transfer of a plurality of sets of compressed image data thus parallelly transferring the plurality of compressed image data and (b) executing a predetermined process on the plurality of sets of the compressed image data synchronized in the step (a).

According to another aspect of the present invention, the method for processing image data comprises the steps of (a) compressing image data and (b) executing a predetermined image correction process on the image data compressed in step (a).

Further to the above mentioned methods, an apparatus essentially employing at least one of the above mentioned methods is also within the scope of the present invention.

BRIEF DESCRIPTION OF THE DRAWINGS

FIG. 13 is a block diagrammatic representation of an MTF correction unit which is the second embodiment of the invention;

FIG. 14 is a block diagrammatic representation of an MTF correction unit which is the third embodiment of the invention;

FIG. 24(A) provides diagrammatic illustrations of one example of a digital filter;

FIG. 24(B) provides diagrammatic illustrations of another example of a digital filter;

FIG. 27 is a block diagrammatic representation of an MTF correction unit which is the seventh embodiment of the invention, a magnification changing unit being provided at the output side thereof in addition to that provided at the input side thereof;

FIG. 28(A) provides a table in which the relationship between the compressibility of input data and the storage capacity of memories;

FIG. 28(B) provides a table in which the relationship between the compressibility of input data and the storage capacity of memories;

FIG. 28(C) provides a table in which the relationship between the compressibility of input data and the storage capacity of memories;

DESCRIPTION OF THE PREFERRED EMBODIMENTS

First Embodiment

Figure 1:
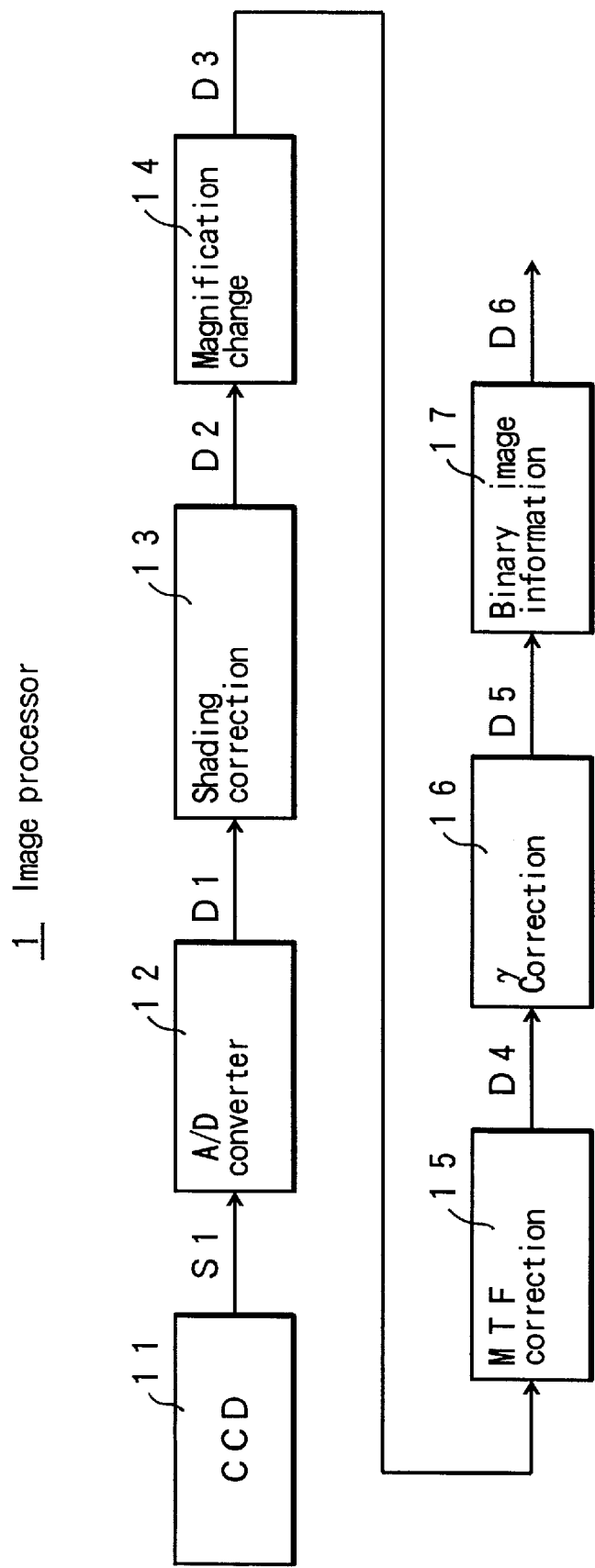
FIG. 1 is a block diagrammatic representation of an image processor.

Referring now to FIG. 1, an image processor 1 comprises an image sensor 11, A/D converter 12, shading correction unit 13, magnification changing unit 14, MTF correction unit 15, $\gamma$ correction unit 16 and binary image formation unit 17.

The image sensor 11 is a CCD line sensor. A scanning mechanism (not shown) effects relative displacement of the image sensor 11 with respect to a document. Imaging of the document is achieved in order of successive lines. A picture signal Si is serially outputted from one pixel after another.

The analog picture signal S1 is quantized in the A/D converter 12 so as to be serially converted into digital image data D1 which, in this embodiment, consists of 8 bits per pixel and hence is capable of being shaded on 256 scales.

In the shading correction unit 13, the image data D1 is subjected to shading correction and, as occasion demands, to LOG transform. The output of the shading correction unit 13 is image data D2.

The image data D2 is enlarged or contracted in the magnification changing unit 14, from which image data D3 is outputted.

The changing unit 14 corresponds to "a data source" in claim 1.

The image data D3 is subjected to MTF correction in the MTF correction unit 15, from which image data D4 is outputted.

The MTF correction unit 15 or the image processor 1 corresponds to "an image processing device" in claim 1.

The image data D4 is subjected to $\gamma$ correction in the $\gamma$ correction unit 16, from which an image data D5 is outputted. The image data D5 is subjected to binary image formation in the binary image formation unit 17, from which binary image data D6 is outputted.

The foregoing are well known in the art as conventional, except for the MTF correction unit 15 which will be hereinafter more fully described.

Figure 2:
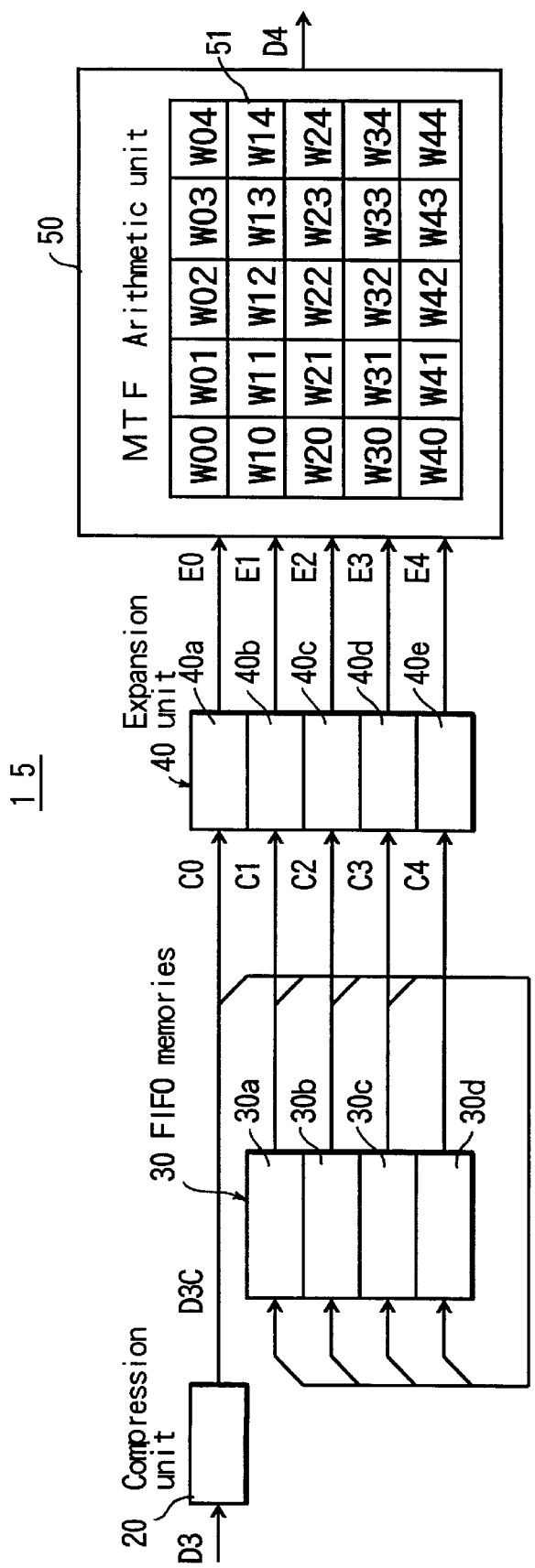
FIG. 2 is a block diagrammatic representation of an MTF correction unit which is the first embodiment of the invention.

Referring now to FIG. 2, the MTF correction unit 15 comprises a compression unit 20, FIFO (First-In First-Out) memory 30, expansion unit 40 and MTF arithmetic unit 50.

The compression unit 20 corresponds to "a compressor" and the FIFO memory 30 corresponds to "a buffer section" in claim 1.

The expansion unit 40 corresponds to "an expander" in claim 3.

The MTF arithmetic unit 50 corresponds to "correction circuit" in claim 4.

A combination of the expansion unit 40 and the MTF arithmetic unit 50 corresponds to "an image processing section" in claim 1.

In the compression unit 20, serially fed image data D3 are divided into a plurality of blocks, each of which consists of image data D3 obtained from n pixels. The constituents of one block after another are compressed so that compressed image data D3C may result therefrom. Compression of this type is sometimes referred to as the "Generalized Block Truncation Coding (GBTC)" by persons having an ordinary skill in the art.

Figure 3:
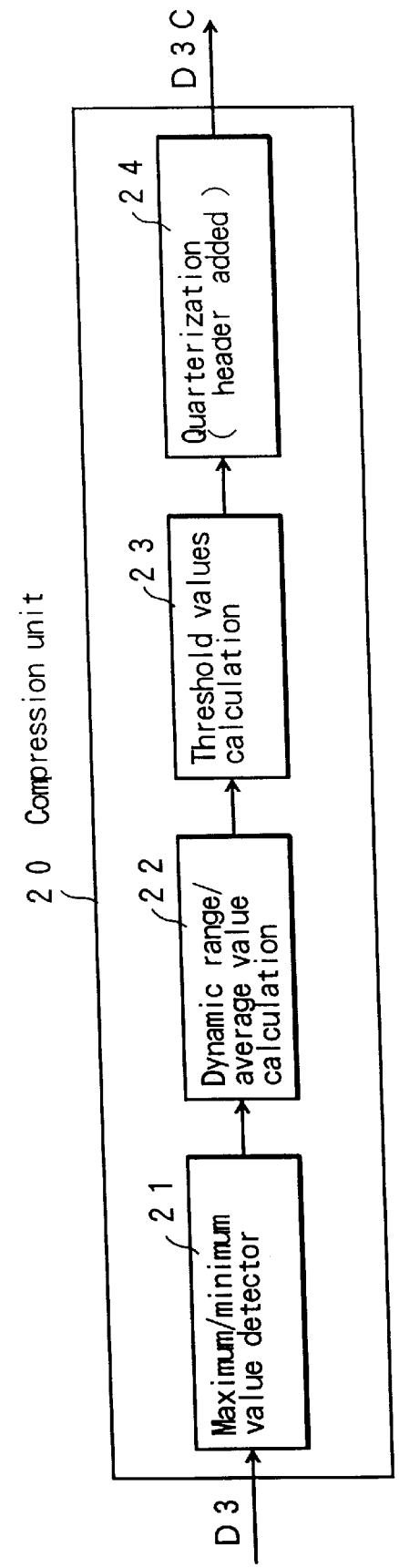
FIG. 3 is a block diagrammatic representation of the compression unit.

Referring now to FIG. 3, the compression unit 20 consists of a maximum/minimum value detector 21, dynamic range/average value calculation unit 22, threshold values calculation unit 23 and quarterization unit 24.

In the maximum/minimum value detector 21, serially fed image data D3 are divided into a plurality of blocks, each of which consists of image data D3 obtained from n pixels.

A maximum value MAX (FIG. 6) and a minimum value MIN are detected in each block.

A dynamic range LD calculated in the dynamic range/average value calculation unit 22 is the difference between the maximum value MAX and the minimum value MIN. An average value LA, which is also calculated in the dynamic range/average value calculation unit 22, is given by

LA=(MAX+MIN)/2

In the threshold values calculation unit 23, a first threshold value L1 and a second threshold value L2 are calculated from L1=LA−LD/4 and

Figure 6:
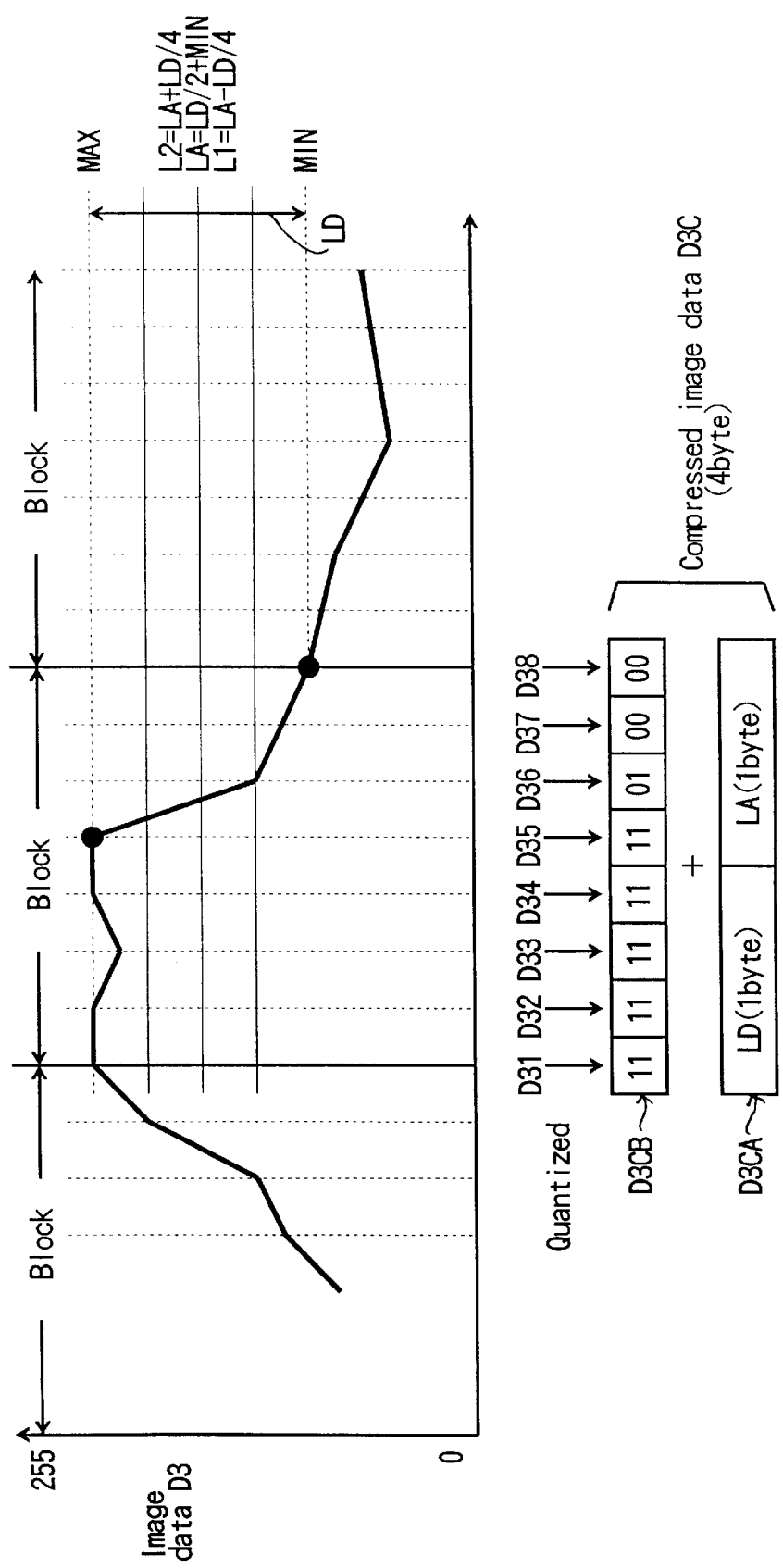
FIG. 6 is a view showing an improved method of producing compressed image data.

L2=LA+LD/4 and used, together with the average value LA, for dividing the dynamic range LD into four equal subranges as shown in FIG. 6.

In the quarterization unit 24, the value of data taken from one pixel after another is compared with the floating threshold values L1, LA and L2, and the p-bit image data D3 is converted into q-bit encoded data D3CB. In this embodiment, p and q assume the values of 8 and 2 respectively. A 2-byte header D3CA, which consists of a dynamic range LD and an average value LA for each block, is added to the encoded data D3CB. The output of the quarterization unit 24 is compressed image data D3C which is converted from image data D3 obtained from n pixels.

As this specification proceeds, there are some cases where the expression "encoded data D3CA" is used as a synonym for the header D3CA and where the expression "encode bits" is used as a synonym for the 2 bits of which encoded data D3CB consists per pixel.

Thus the compressed image data D3C for each block consists of the 2-byte headder D3CA and the n/4 byte encoded data D3CB. This means that the n-byte input data are compressed into (2+n/4) bytes with a compressibility CR of (2+n/4)/n. Since the quantity of data is thus reduced to (2+n/4)/n, the storage capacity of the FIFO memory 30 can be reduced. The compressibility CR may be expressed in terms of the aforesaid p and q as follows:

$$CR=(2+n \cdot q/p)/n$$

By changing the value of n, changes in the compressibility CR may be made in the compression unit 20 such that the compressibility CR will be ½, ⅜, 5/16 or 9/32 when n assumes a value of 8, 16, 32 or 64 respectively.

Figure 5:
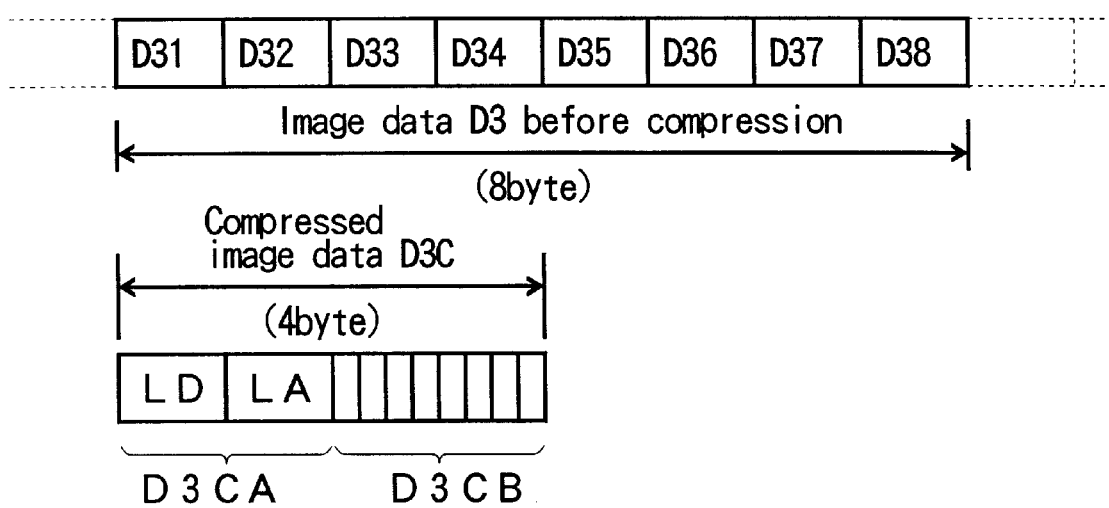
FIG. 5 represents the image data in an uncompressed and compressed form respectively.

FIG. 5 provides a diagrammatic illustration of an example of compressed image data D3C compressed into ½ with n allowed to assume a value of 8. The compressibility CR assumes a value of 1 when the compression unit 20 remains in an inoperative state, because in this case the image data D3 is allowed to pass therethrough without being compressed.

Compressed image data D3C derived from one line after another are outputted from the compression unit 20. Until the compressed image data D3C derived from the fifth line is outputted from the compression unit 20, FIFO memories 30a to 30d of which the FIFO memory 30 consists store the compressed image data D3C derived from the first to fourth lines respectively. The expansion unit 40 consists of five subunits 40a to 40e for receiving five sets of compressed image data D3C from the compression unit 20 and the FIFO memories 30a to 30d respectively.

As this specification proceeds, there are some cases where all or some of the FIFO memories 30a to 30d are referred to as the "FIFO memories 30", where one of the FIFO memories 30a to 30d is referred to as the "FIFO memory 30", where the compressed image data D3C transmitted from the compression unit 20 directly to the subunit 40a is referred to as the "data C0", and where the compressed image data D3C outputted from the FIFO memories 30a to 30d are referred to as the "data C1 to C4" respectively.

Figure 4:
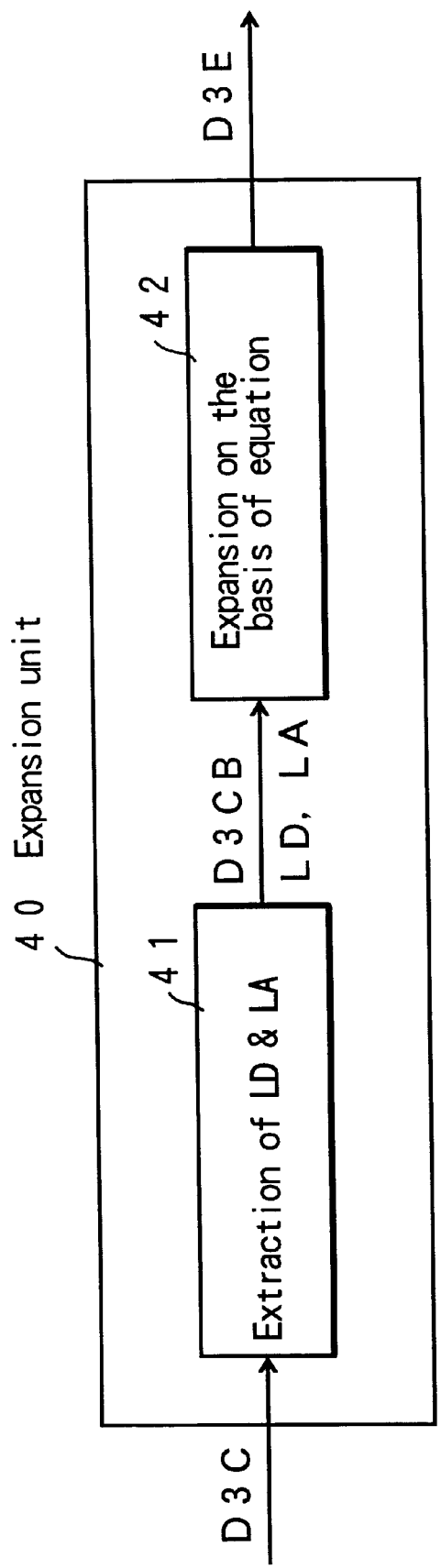
FIG. 4 is a block diagrammatic representation of an expansion unit.

The subunits 40a to 40e expand the compressed image data D3C and produce restored image data D3E (FIG. 4). As this specification proceeds, there are some cases where all or some of the subunits 40a to 40e are referred to as the "expansion units 40" and where one of the subunits 40a to 40e is referred to as the "expansion unit 40".

As shown in FIG. 4, each expansion unit 40 comprises a means 41 for extracting a dynamic range LD and an average value LA from the compressed image data D3C and a means 42 for expanding the compressed image data D3C in accordance with a value assumed by the encoded data D3CB. This expansion causes 2-bit data to be restored to 8-bit data.

Various equations may be used for expansion in the means 42, an example of which is as follows:

$$E=LA-LD/2+LD \times Xk/3 \qquad (1)$$

where E=expanded image data D3E

Xk=any of four integers 0, 1, 2 and 3 that can be assumed by encoded data D3CB

Therefore, when Xk=0, 1, 2 and 3, the respective values of E would be $$E=LA-LD/2$$

$$E=LA-LD/6$$

$$E=LA+LD/6$$

$$E=LA+LD/2$$

In the expansion units 40, the compressed image data D3C transmitted from the compression unit 20 directly to the subunit 40a and the compressed image data D3C outputted from the FIFO memories 30 are expanded at a synchronized time, and image data E0 to E4 are produced respectively therefrom at a time and fed to the MTF arithmetic unit 50 at a time.

Figure 12:
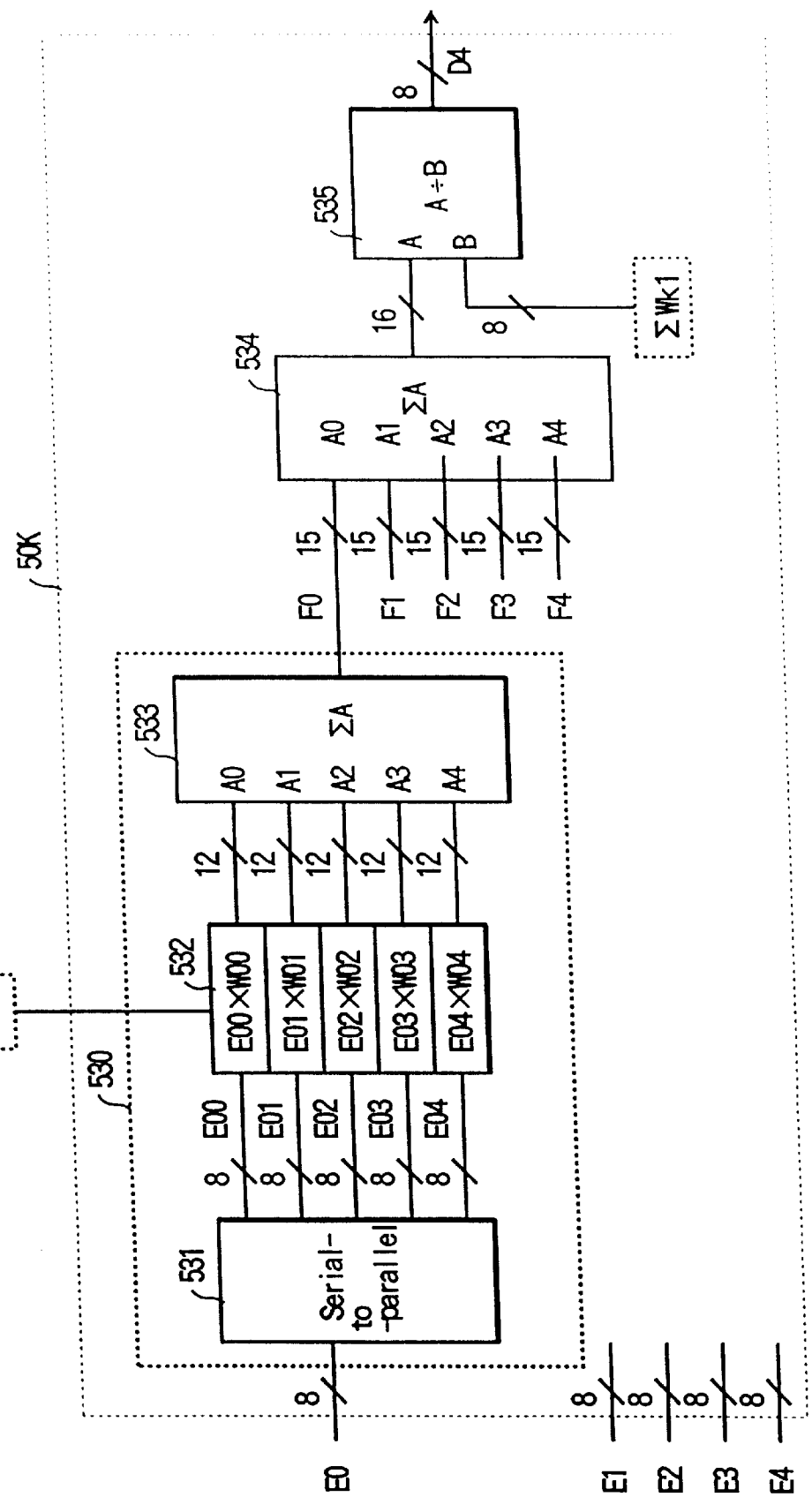
FIG. 12 provides a diagrammatic illustration of an example of the arithmetic unit for MTF.
Figures 24A, 24B:
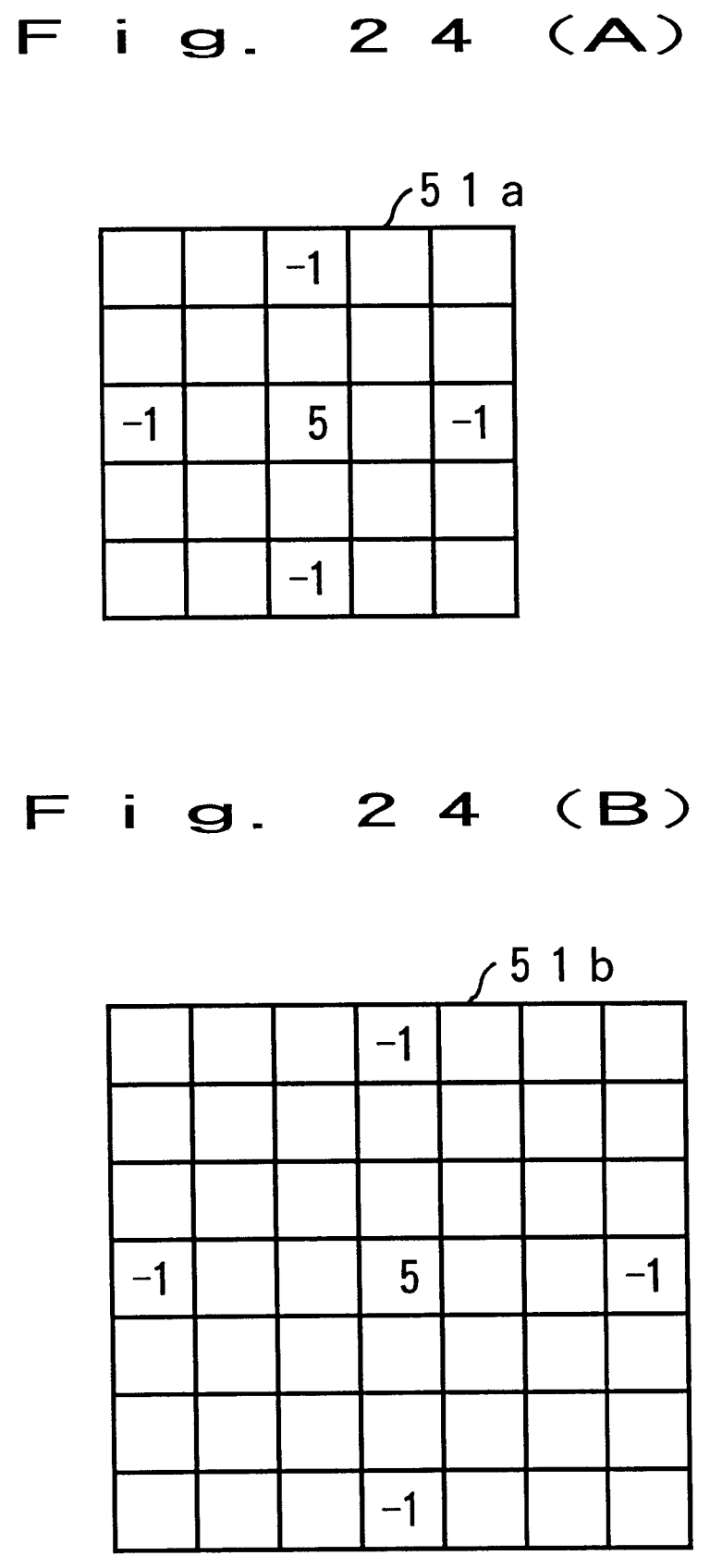

In the MTF arithmetic unit 50, the image data Ek1, a definition of which will be given when they are hereinafter described with reference to FIG. 12, are subjected to spatial filtering such as edge sharpening. For this purpose, a two-dimensional digital filter 51a, which is the size of 5×5 as shown in FIG. 24(A), is applied to the image data Ek1. The digital filter 51a or 51 (FIG. 2) has a weighting matrix Wk1, with which arithmetic operations are performed for finding a sum of weighted products with respect to the image data Ek1. The output of the MTF arithmetic unit 50 is image data D4, which is given by $$D4=\Sigma(Wk1 \times Ek1)/\Sigma Wk1 \qquad (2)$$

The manner in which the MTF correction unit 15 works will now be described with reference to FIG. 7.

Figure 7:
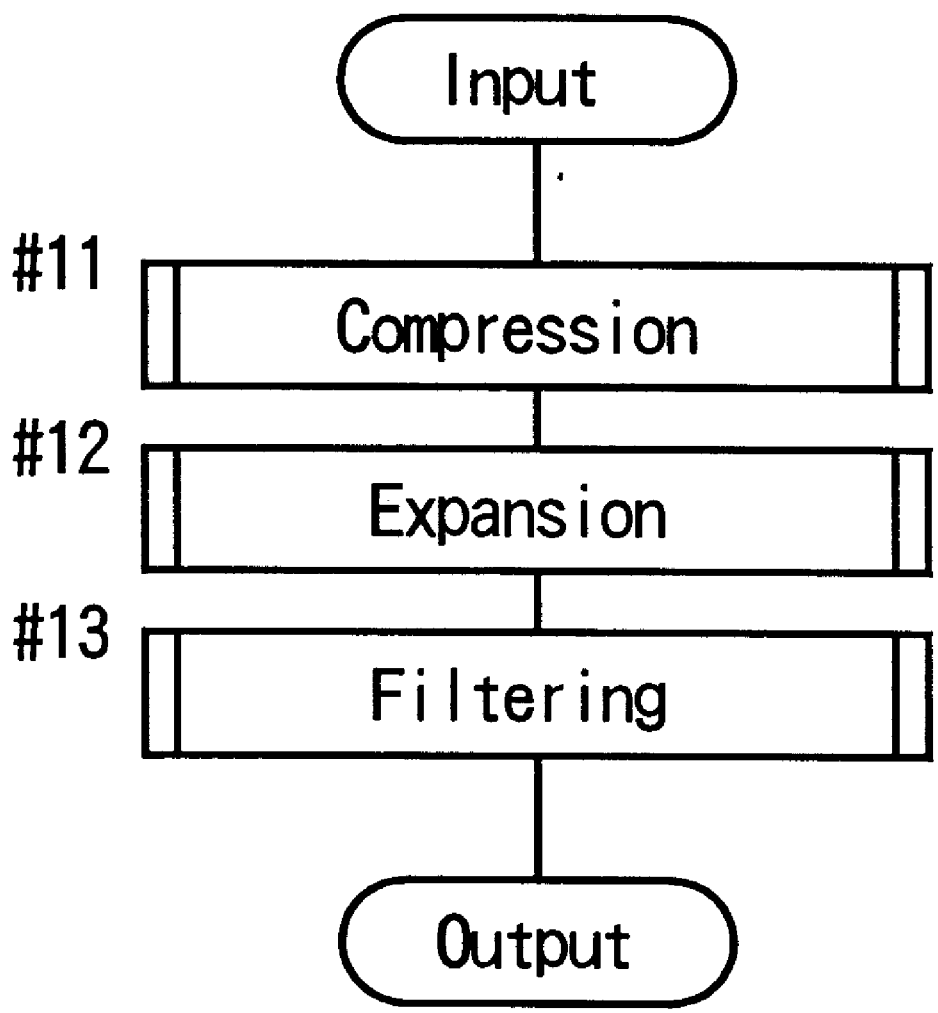
FIG. 7 is a flow diagram representing successive steps in a typical operation performed in the MTF correction unit shown in FIG. 2.

Referring now to FIG. 7, the image data D3 fed to the MTF correction unit 15 is compressed (step 11). Until the compress ed image data D3C derived from the fifth line is outputted from the compression unit 20, FIFO memories 30 store the compressed image data D3C derived from the first to fourth lines respectively. The compressed image data D3C derived from these five lines are expanded at a time in the expansion units 40 (step 12) and subjected to digital filtering (step 13).

Figure 8:
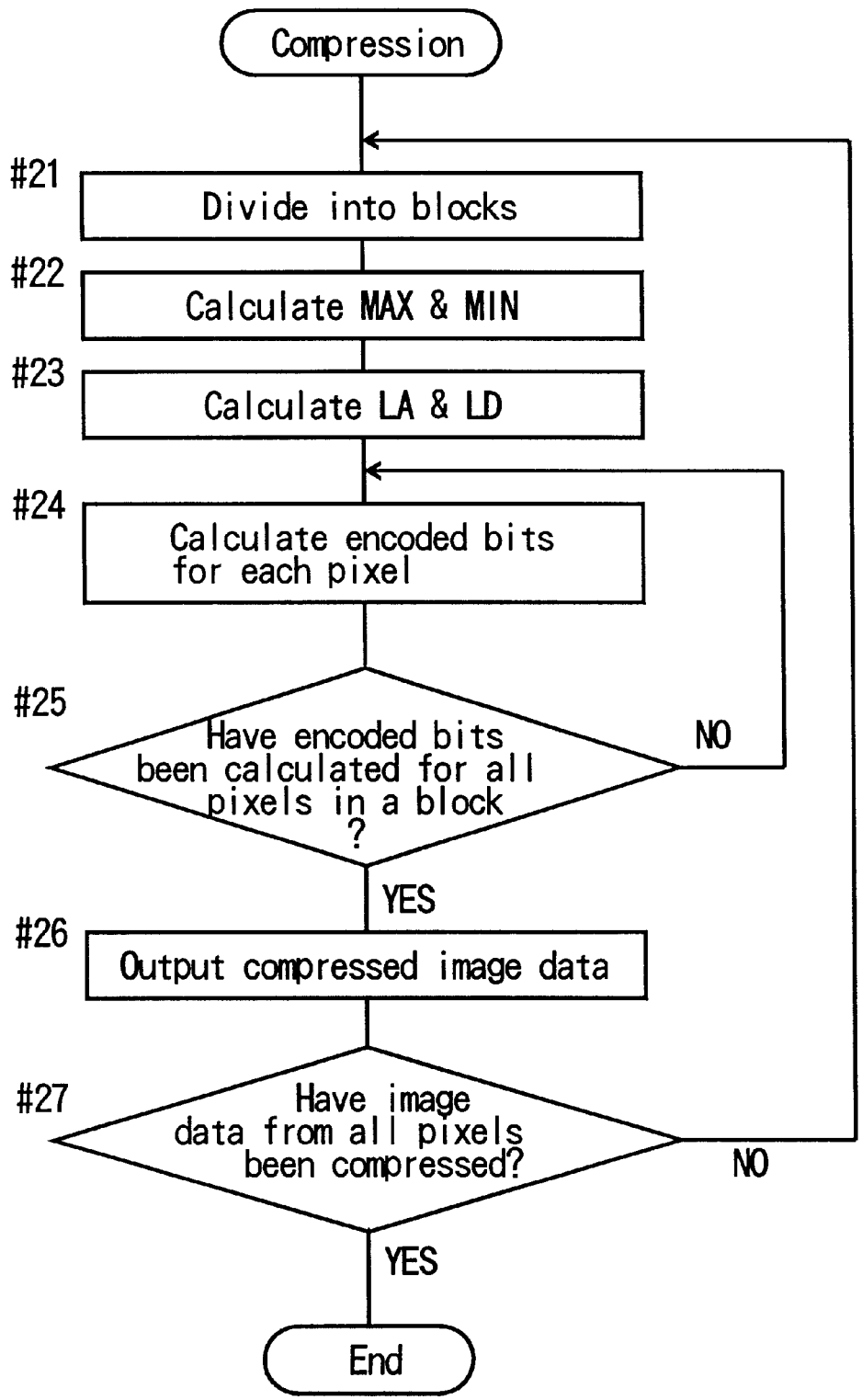
FIG. 8 is a flow diagram representing successive steps in a typical operation performed for the compression of image data.

FIG. 8 is a detail showing a portion of FIG. 7 in connection with the compression of the image data D3. Serially fed image data D3 are divided into a plurality of blocks (step 21). A maximum value MAX and a minimum value MIN are detected in each block (step 22). In order to obtain a header D3CA, a dynamic range LD and an average value LA are calculated (step 23). The image data D3 transmitted from each pixel are quarterized. Encoded bits for n pixels are calculated for obtaining an encoded data D3CB (steps 24 and 25). Compressed image data D3C is obtained and outputted (step 26). Steps 21 to 26 are repeated until the image data D3 transmitted from all the pixels are compressed (step 27).

Figure 9:
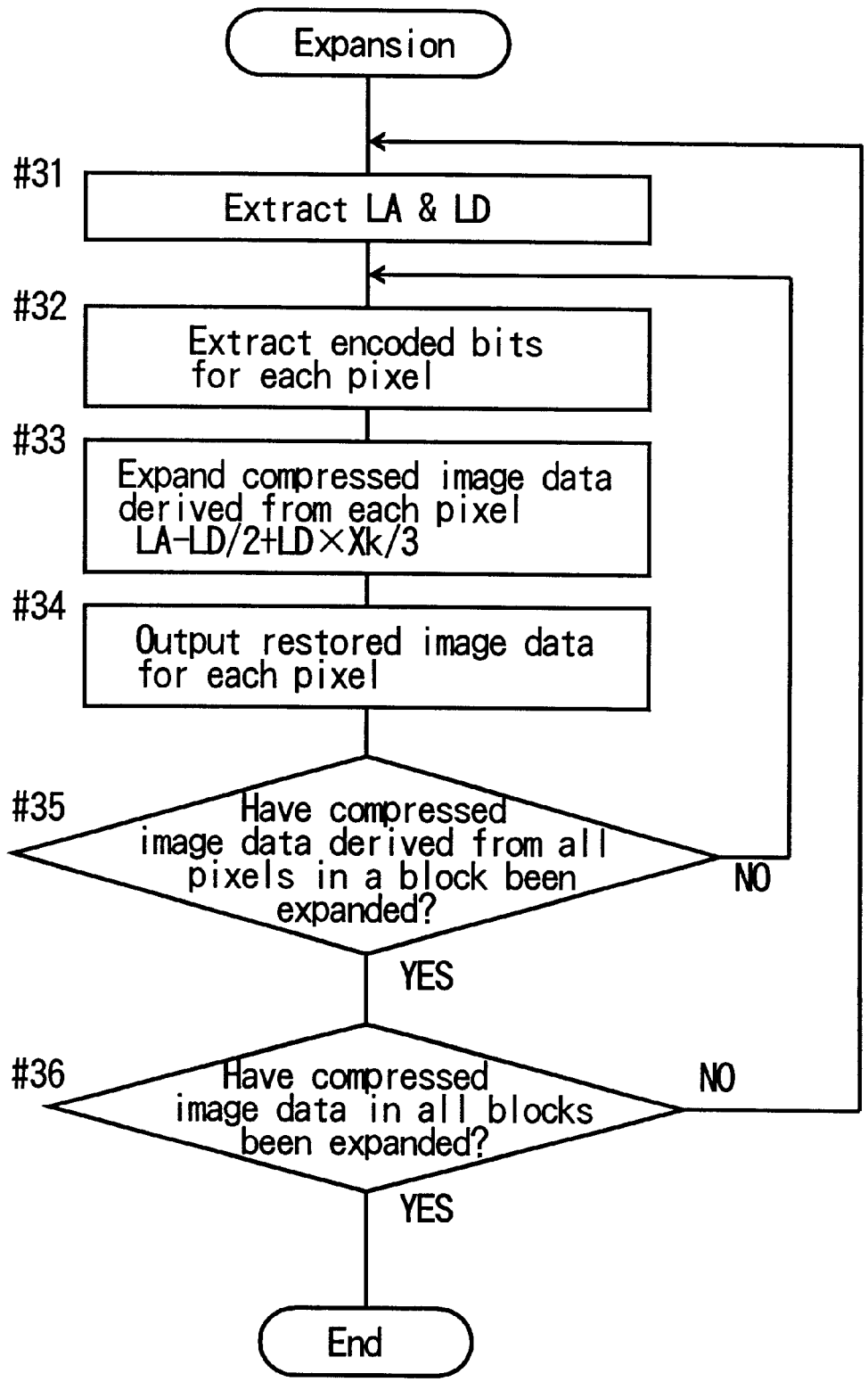
FIG. 9 is a flow diagram representing successive steps in a typical operation performed for the expansion of image data.

FIG. 9 is a detail showing another portion of FIG. 7 in connection with the expansion of the compressed image data D3C. The encoded data are extracted (step 31). The encoded bits for each pixel are extracted (step 32). Equation (1) is used for the expansion of the compressed image data D3C derived from each pixel (step 33). Restored image data for each pixel is outputted (step 34). Steps 32 to 34 are repeated until the compressed image data D3C derived from all the pixels in a block are expanded (step 35). The expansion of the compressed image data D3C comes to an end when the compressed image data D3C in all the blocks have been expanded (step 36).

Figure 10:
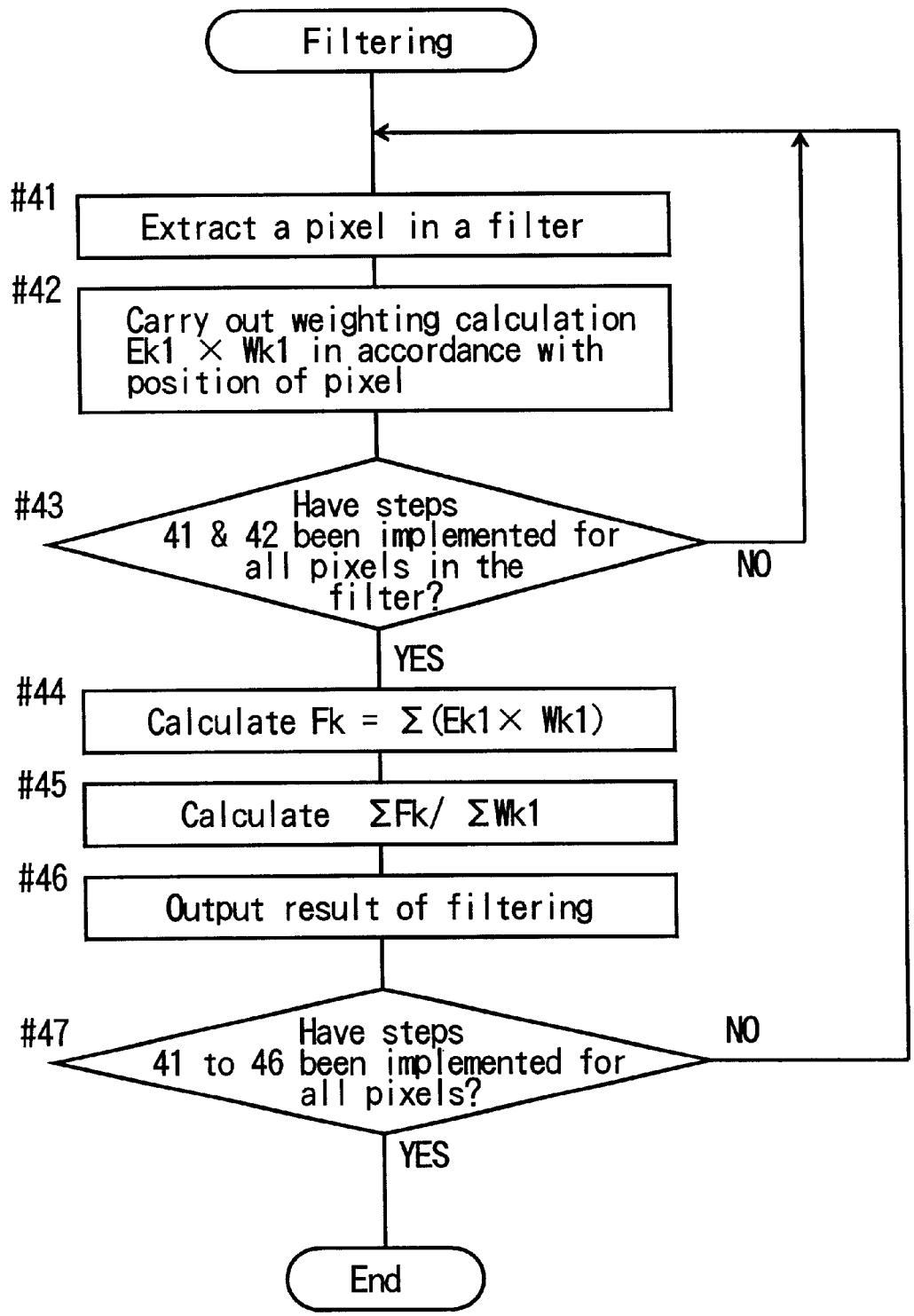
FIG. 10 is a flow diagram representing successive steps in a typical operation performed for filtering.

FIG. 10 is a detail showing still another portion of FIG. 7 in connection with the filtering. A pixel is extracted (step 41). Weighting calculation Ek1×Wk1 is carried out in accordance with the position of the pixel (step 42). Steps 41 and 42 are implemented with respect to all the pixels in the filter (step 43).

The sum Fk of all terms of weighting calculation Ek1×Wk1 is calculated (step 44). The sum ΣFk of all terms of Fk obtained with respect to all the lines is divided by the sum ΣWk1 of all terms of weight factors (step 45). With these steps, corrected image data D4 is provided (step 46).

Figure 11:
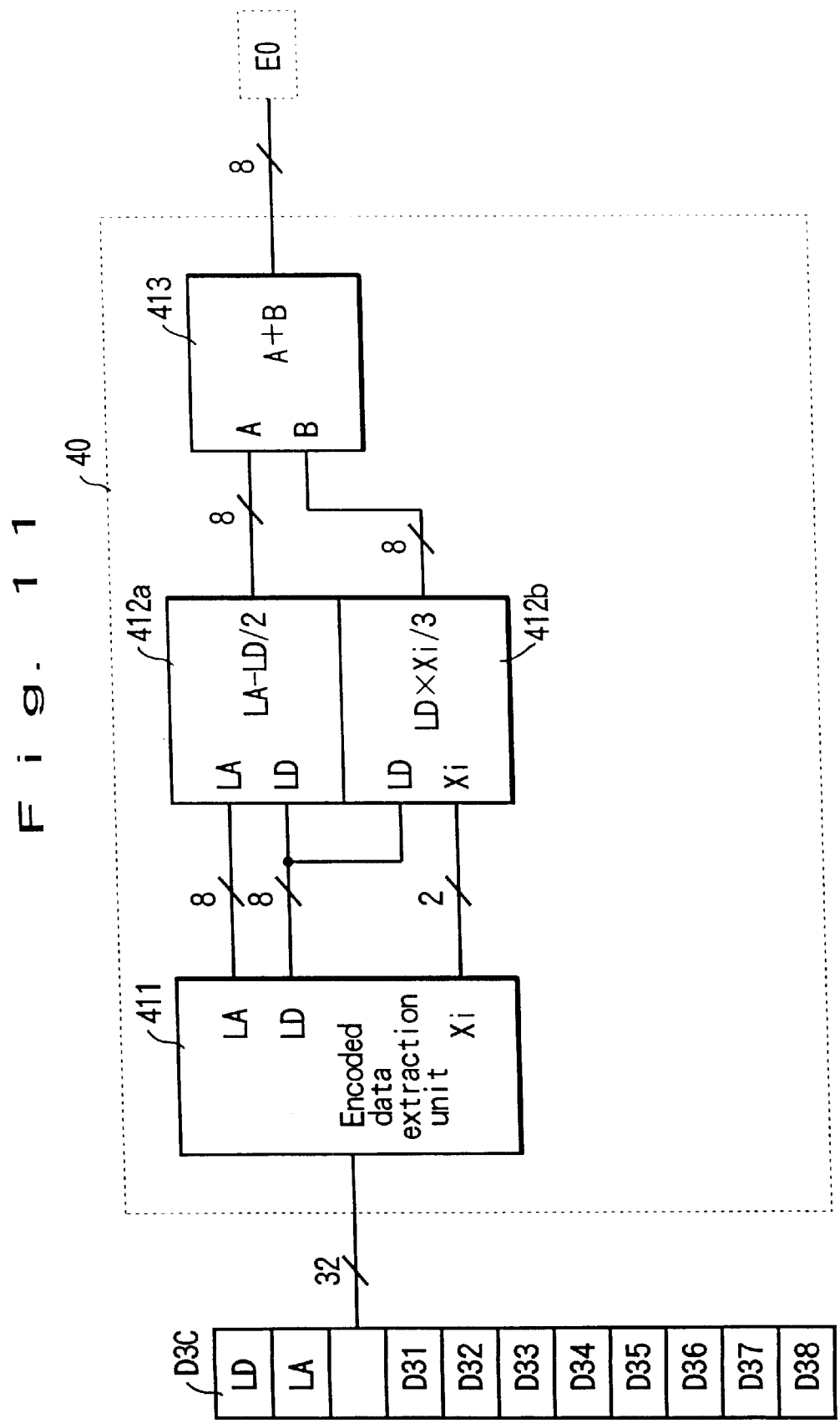
FIG. 11 provides a diagrammatic illustration of an example of the expansion unit.

Referring now to FIG. 11, the subunit 40a of the expansion unit 40 comprises an encoded data extraction unit 411, arithmetic units 412a, 412b and adder 413. Although not shown in the drawing, it should be understood that each of the remaining four subunits has an identical construction with the subunit 40a.

The encoded data extraction unit 411 extracts the headder D3CA and the encoded bits for each pixel. In each of the arithmetic units 412a and 412b, one of two input values is multiplied by the other. In the adder 413, two values transmitted from the arithmetic units 412a and 412b respectively are added to each other. More specifically stated, the adder 413 performs arithmetic operations as shown by equation (1) so as to output a restored image data Ek.

Referring now to FIG. 12, the MTF arithmetic unit 50 comprises a serial-to-parallel converter 531, multipliers 532, adders 533, 534 and divider 535. The serial-to-parallel converter 531, multipliers 532 and adder 533 constitute an arithmetic circuit 530, with which each of five lines allotted for the processing of the restored image data E0 to E4 respectively is provided.

In the serial-to-parallel converter 531, image data Ek1 derived from five pixels required for a single process of filtering are produced from 8-bit image data Ek transmitted one pixel after another. In each of the multipliers 532, image data Ek1 is multiplied by a weight factor Wk1. In the adder 533, the products of Ek1×Wk1 for the aforesaid five pixels are added to each other so that the sum Fk may be calculated as follows:

$$Fk=\Sigma(Ek1\times Wk1)$$

The sum ΣFk of all terms of Fk calculated in the adder 534 represents the aforesaid five lines allotted for the processing of the restored image data E0 to E4 respectively. In the divider 535, the sum ΣFk of all terms of Fk obtained with respect to all the lines is divided by the sum ΣWk1 of all terms of weight factors. With these steps, corrected image data D4 is provided.

Referring now to the relationship between FIGS. 9 and 11, steps 31 and 32 are implemented by the encoded data extraction unit 411, and step 33 is implemented by the arithmetic units 412a, 412b and the adder 413. Referring now to the relationship between FIGS. 10 and 12, step 41 is implemented by the serial-to-parallel converter 531, step 42 is implemented by the multipliers 532, step 44 is implemented by the adder 533, and step 45 is implemented by the adder 534 and the divider 535.

A particular advantage obtained from the foregoing first embodiment of the invention resides in the fact that the storage capacity of the FIFO memories 30 can be reduced, because the quantity of data to be processed is minimized by the compression unit 20 in which the image data D3 are compressed. The compression unit 20, FIFO memories 30, expansion unit 40 and MTF arithmetic unit 50 may take the form of hardware, software, or a combination of both.

In this embodiment, the image data D3 are compressed by one-dimensional block coding, which is a kind of fixed-length coding and serves to reduce the quantity of data to be processed irrespective of a data type. Thus the disadvantage of variable-length coding is overcome, which resides in the fact that there are some cases where variable length coding causes the quantity of data to be increase by the compression of the image data D3.

Second Embodiment

FIG. 13 shows a modified form of MTF correction unit. The MTF correction unit 15A shown therein is generally similar to the MTF correction unit 15 shown in FIG. 2 except that a FIFO memory 30A consists of five FIFO memories 30a to 30e. In referring to this and the succeeding embodiments, it should be noted that only dissimilar portions will be described and the description of similar portions will be omitted for simplicity.

The embodiment of FIG. 13 differs from that of FIG. 2 by the fact that compressed image data D3C derived from one line after another are stored in one FIFO memory after another until the compressed image data D3C derived from the fifth line is stored in the fifth FIFO memory. Consequently, the total storage capacity of the FIFO memory 30A has to be somewhat greater than that of the FIFO memory 30.

Third Embodiment

The MTF correction unit 15B shown in FIG. 14 differs from the previously described embodiments in the manner in which the image data D3 derived from the fifth line is handled. More specifically stated, the image data D3 derived from the fifth line is left uncompressed and fed as it is to the MTF arithmetic unit 50, with the expansion unit skipped. The image data D3 derived from the first to fourth lines are handled in the same manner as before described, i.e., compressed and stored in a FIFO memory 30B so as to be expanded at a time in the four subunits 40a to 40d. As this specification proceeds, there are some cases where all or some of the subunits 40a to 40d are referred to as the "expansion units 40B" and where one of the subunits 40a to 40d is referred to as the "expansion unit 40B".

The FIFO memory 30B is controlled so that, simultaneously with the feed of the image data D3 derived from the fifth line to the MTF arithmetic unit 50, the compressed image data D3C taken out of the FIFO memory 30B may also be fed at a time to the MTF arithmetic unit 50 after passage through the expansion units 40B.

Fourth Embodiment

Figure 15A:
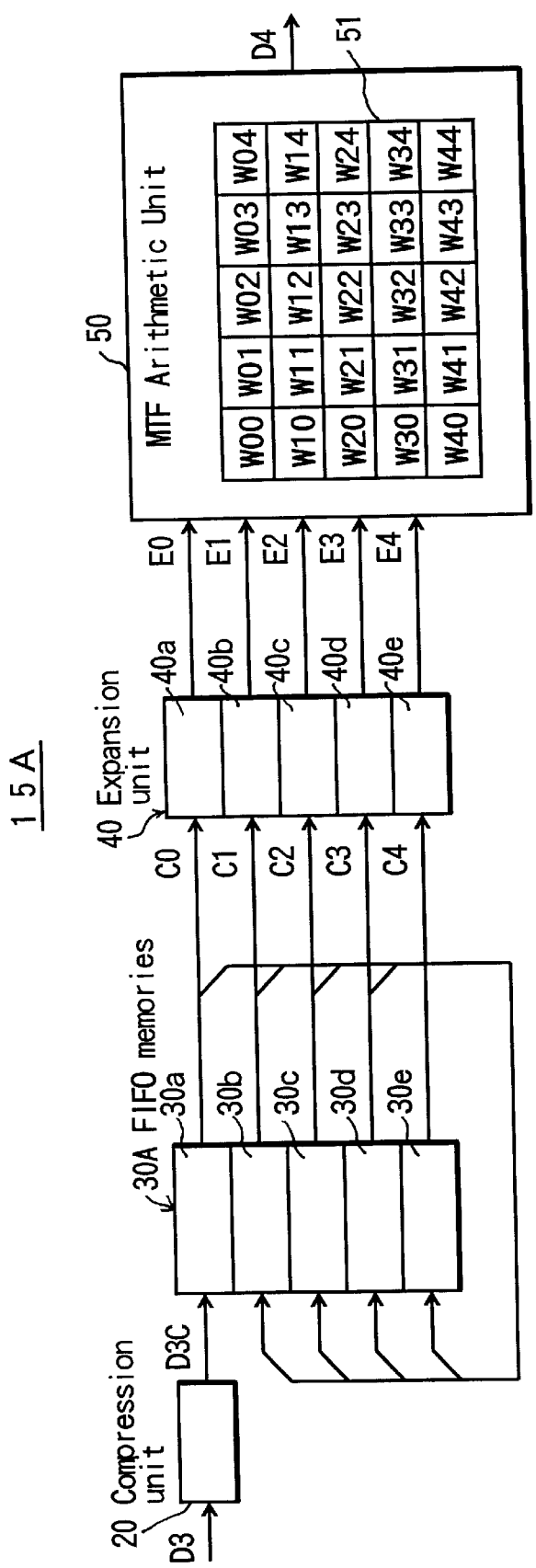
FIG. 15 is a block diagrammatic representation of an MTF correction unit which is the fourth embodiment of the invention.

The MTF correction unit 15X shown in FIG. 15 differs from the MTF correction unit 15 shown in FIG. 2 by the fact that an MTF arithmetic unit 5OX included in the former is capable of carrying out data processing carried out by the expansion units 40 and the MTF arithmetic unit 50 in the latter. The MTF arithmetic unit 5OX corresponds to "an image processing section" in claim 1.

The following equation (3), which is obtained when equation (1) is put into equation (2), is used for data processing to be carried out by the MTF arithmetic unit 50X:

$$D4=\Sigma(Wk1\times Ek1)/\Sigma Wk1=\Sigma[\{(LA1k-LD1k/2)\times\Sigma Wk1+LD1k\times\Sigma Xk, i\times Wi/3\}+\{(LA2k-LD2k/2)\times\Sigma Wkj+LD2k\times\Sigma Xk, j-M1\times Wi/3\}]/\Sigma Wk1 \quad (3)$$

where
- LA1k=average value LA formed from the newer one of the two blocks of compressed image data D3C subjected to data processing at a time
- LD1k=dynamic range LD of the newer one of the two blocks of compressed image data D3C subjected to data processing at a time
- LA2k=average value LA formed from the older one of the two blocks of compressed image data D3C subjected to data processing at a time LD2K=dynamic range LD of the older one of the two blocks of compressed image data D3C subjected to data processing at a time M1=number of pixels from which the newer one of the two blocks of compressed image data D3C subjected to data processing at a time is derived i=any of integers 0 to M1−1 j=any of integers M1 to 4

Equation (3) takes advantage of the ease of calculation of equation (1). This ease of calculation is derived from the fact that the term (LA−LD/2), which can be used in common in a block because it is independent of the value of Xk, is calculated separately from the term (LD×Xk/3), which depends on the value of Xk and has to be calculated with respect to each pixel.

Figure 19:
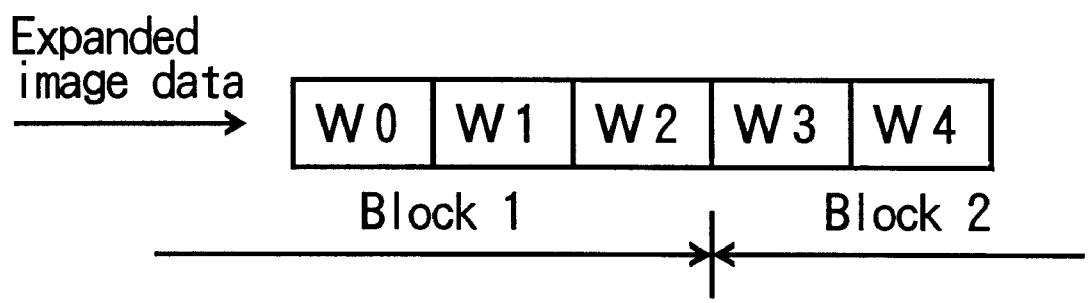
FIG. 19 is a view useful in understanding a basic principle of one-dimensional digital filtering.

FIG. 19 is a view useful in understanding an advantage offered by calculation with equation (3). In referring to FIG. 19, it will be noted that the case where compressed image data D3C are subjected to one-dimensional digital filtering is illustrated.

Since each of the blocks consists of compressed image data D3C derived from 8 pixels, the number of blocks which can be subjected to digital filtering of the size of 5×1 at a time is one or two. In FIG. 19, the case where two blocks are subjected to such digital filtering at a time is illustrated. The newer one of the two blocks is designated as "block 1", and the older one of the two blocks is designated as "block 2". The compressed image data D3C derived from three pixels in block 1 and those derived from two pixels in block 2 are being subjected to the aforesaid digital filtering at a time.

The compressed image data D3C derived from the first three pixels in block 1 are multiplied by weight factors W0, W1 and W2. The compressed image data D3C derived from the last two pixels in block 2 are multiplied by weight factors W3 and W4. For the purpose of digital filtering, these five data are added to each other. Image data D4 obtainable from this digital filtering is given by $$D4=\Sigma(Wk \times Ek)/\Sigma Wk \quad (4)$$

where k=any of five integers 0 to 4

The following equation (5), which is obtained when equation (1) is substituted for Ek in equation (4), allows the compressed image data D3C to be subjected to digital filtering simultaneously with expansion in accordance with equation (1):

$$D4=\Sigma(Wk \times Ek)/\Sigma Wk=\Sigma[\{(LA1-LD1/2)\times\Sigma Wi+LD1\times\Sigma Xi\times Wi/3\}+\{(LA2-LD2/2)\times\Sigma Wj+LD2\times\Sigma Xj-M1\times Wi/3\}]/\Sigma Wk \quad (5)$$

where

LA1=average value LA formed from the newer one of the two blocks of compressed image data D3C subjected to data processing at a time LD1=dynamic range LD of the newer one of the two blocks of compressed image data D3C subjected to data processing at a time LA2=average value LA formed from the older one of the two blocks of compressed image data D3C subjected to data processing at a time LD2=dynamic range LD of the older one of the two blocks of compressed image data D3C subjected to data processing at a time M1=number of pixels from which the newer one of the two blocks of compressed image data D3C subjected to data processing at a time is derived i=any of integers 0 to M1−1 j=any of integers M1 to 4

In addition to the simultaneity of digital filtering with expansion, the ease of calculation is a further advantage obtained from equation (5). This ease of calculation is derived from the facts that the terms (LA1−LD1/2) and (LA2−LD2/2) can be used in common in a block and that the terms ΣWi and ΣWj can be used in common for all the pixels in a single process of filtering.

Equation (3) results from applying equation (5) to two-dimensional digital filtering. As has been above explained, equation (3) takes advantage of the ease of calculation of equation (1). This ease of calculation is derived from the fact similar to those from which the ease of calculation of equation (5) is derived.

The manner in which the MTF correction unit 15X works and is constructed will now be described with reference to FIGS. 16 to 18(A), 18(B). The construction and function of the compression unit 20 and the FIFO memory 30 included in the MTF correction unit 15X are similar to the construction and function of those included in the MTF correction unit 15.

Figure 16:
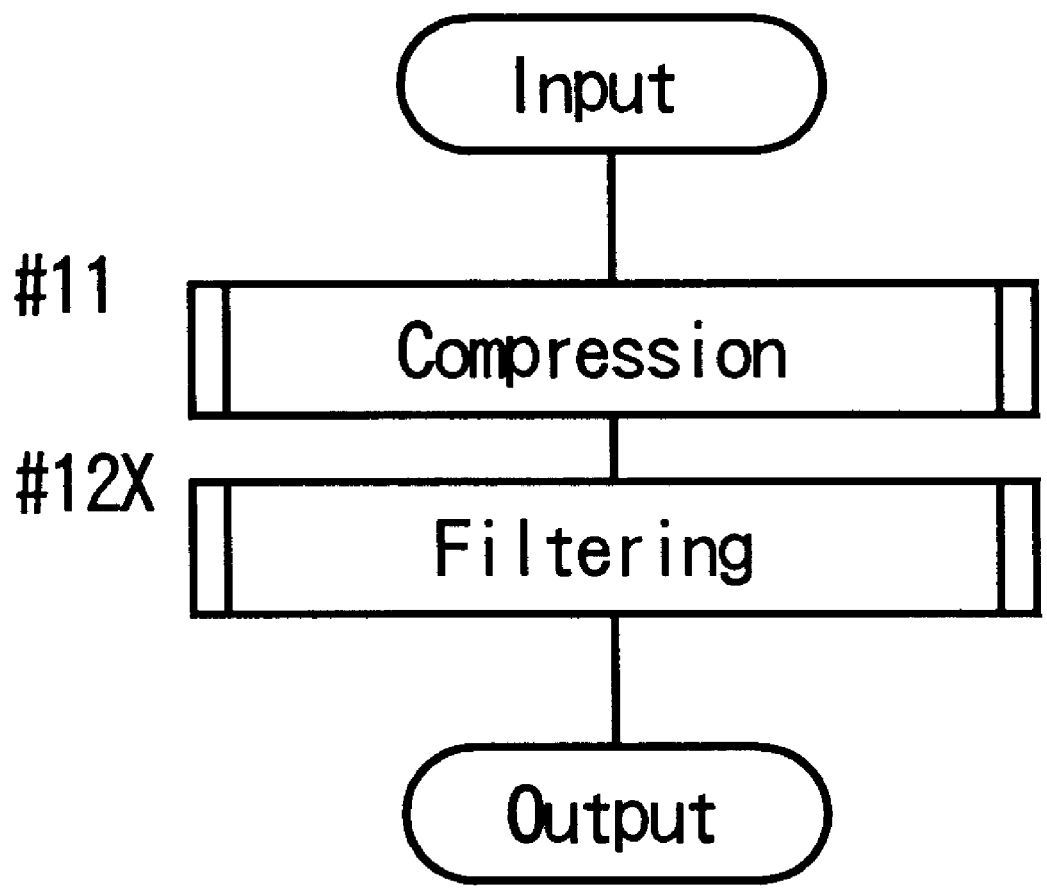
FIG. 16 is a flow diagram representing successive steps in a typical operation performed in the MTF correction unit shown in FIG. 15.

Referring now to FIG. 16, the image data D3 fed to the MTF correction unit 15X is compressed (step 11) and then subjected to digital filtering (step 12X).

Figure 17:
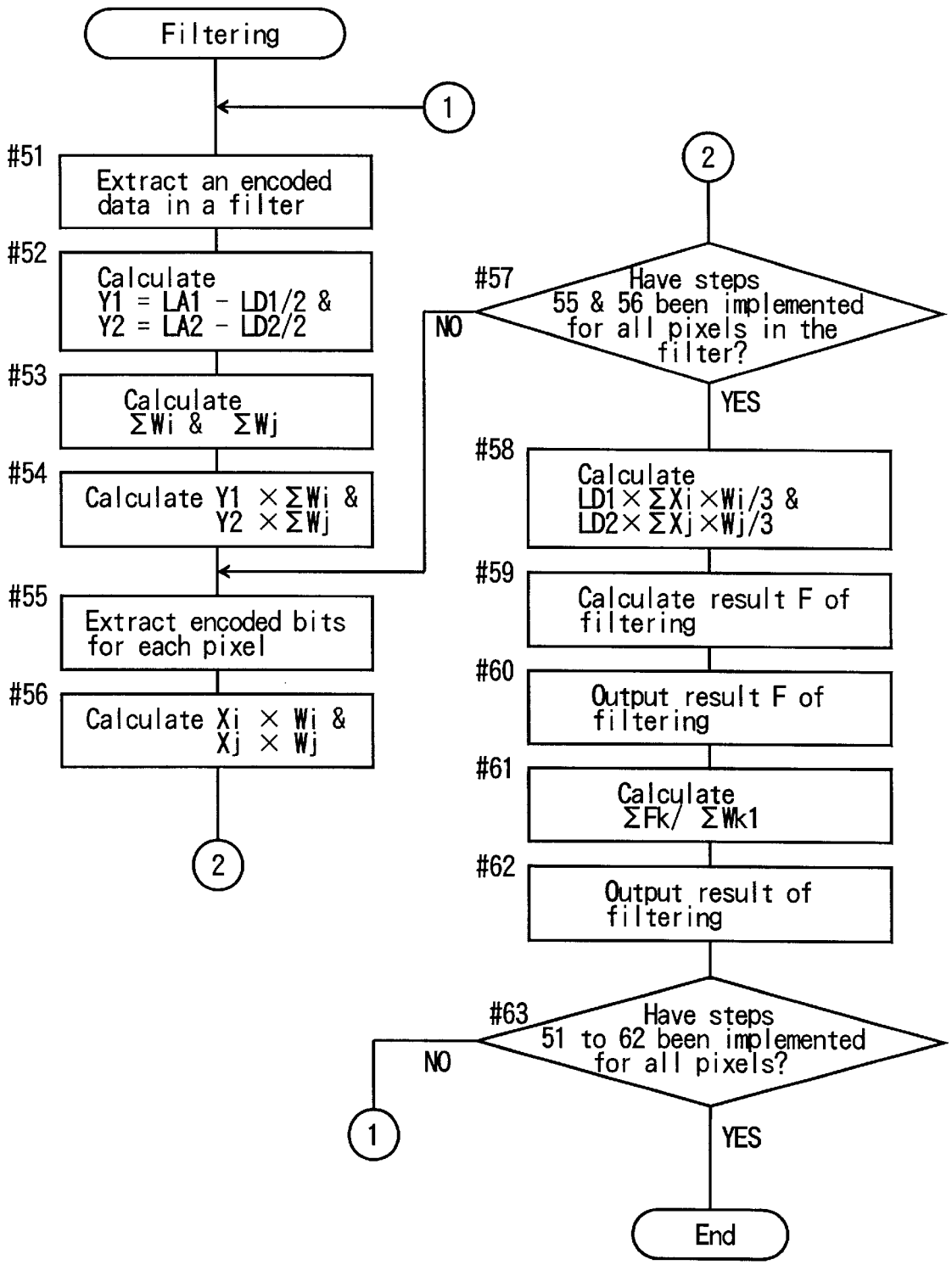
FIG. 17 is a flow diagram representing successive steps in a typical filtering operation performed therein.
Figure 18:
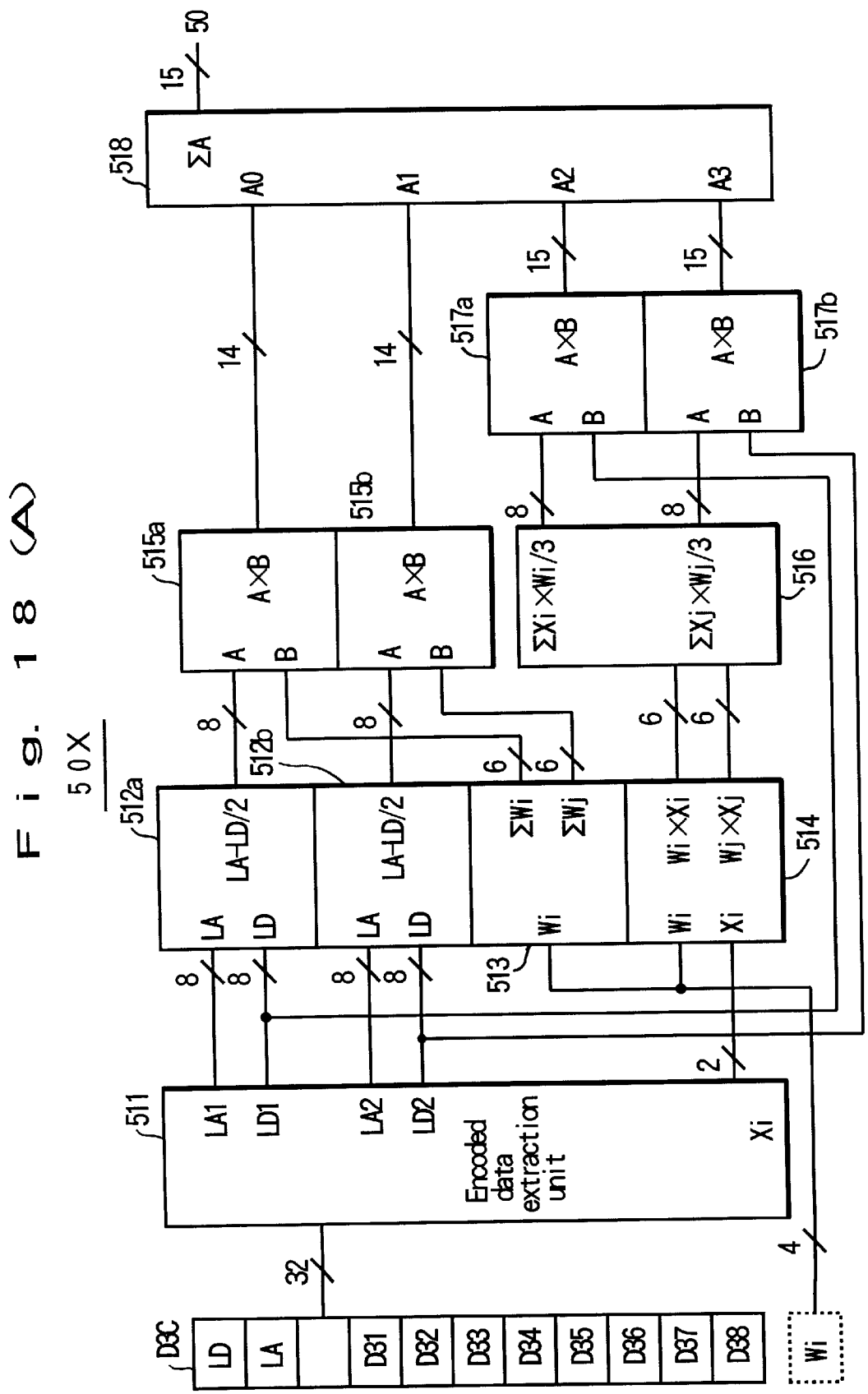
FIGS. 18(A) and 18(B) provide a diagrammatic illustration of an example of the MTF arithmetic unit.
Figure 18:
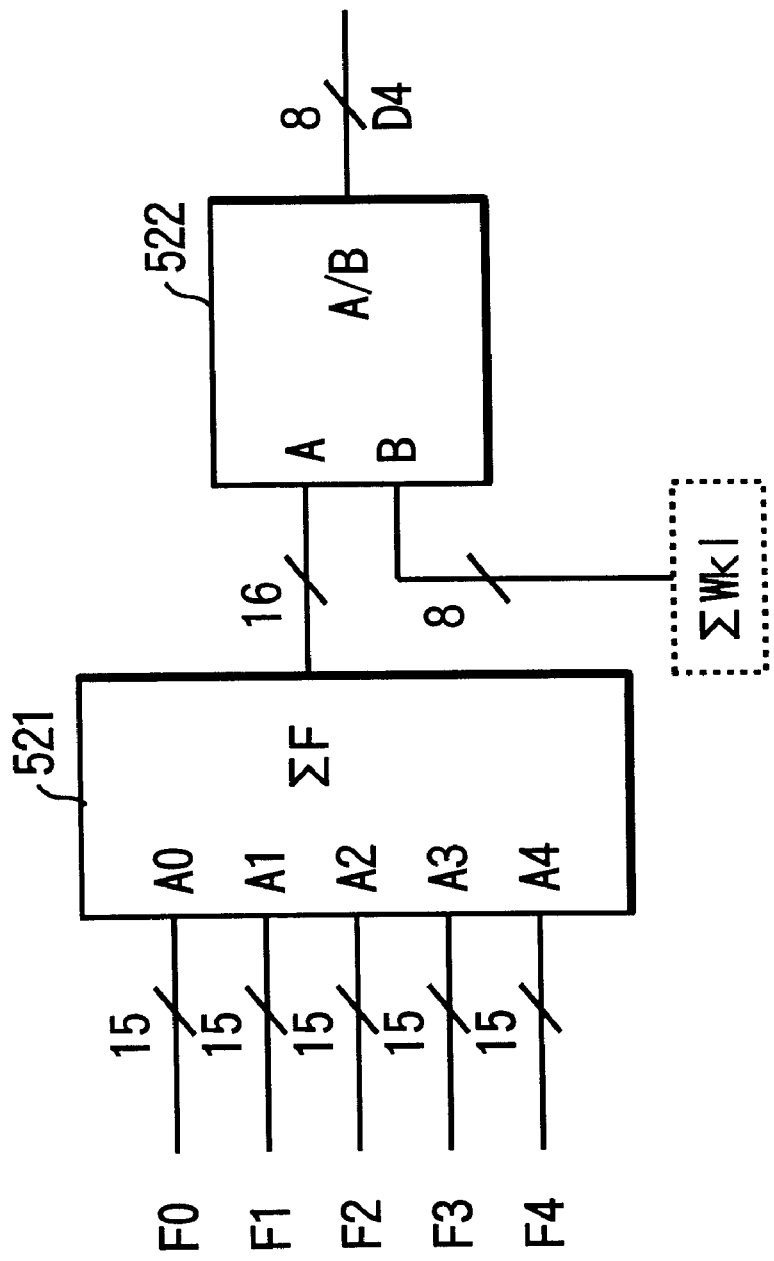

FIG. 17 is a detail showing a portion of FIG. 16 in connection with the filtering. Encoded data required for a single process of filtering are extracted from the compressed image data D3C (step 51). The values of terms which are used in common in a block are calculated (step 52) and stored in appropriate memory locations. The values of the terms ΣWi and ΣWj are calculated (step 53). The values of terms which are contained in equation (3) as being used in common for each pixel in a single process of filtering are calculated from the results of calculation carried out in steps 52 and 53 (step 54).

The encoded bits for each pixel are extracted (step 55). The values of the terms Xi×Wi and Xj×Wj are calculated from the encoded bits for each pixel and from the result of calculations carried out in step 53 (step 56). Steps 55 and 56 are repeated until calculation has been carried out for all the pixels required for a single process of filtering (step 57). On the basis of values obtained therefrom, the values of terms which are contained in equation (3) and of which the values have to be found for each pixel are calculated (step 58).

The result F of calculation carried out for a line is outputted (step 59). The results F0 to F4 of calculation carried out for all the lines are outputted (step 60). The sum ΣFk of all the results F0 to F4 is divided by ΣWk1 (step 61). The result of this calculation is outputted (step 62). Steps 51 to 62 are repeated until the results of calculation carried out for all the pixels are outputted (step 63).

Encoded bits involved in arithmetic operations performed in steps 56 and 58 are characterized by the ease of calculation, because they are 2 bits of which an encoded data D3CB consists per pixel. Consequently, the electrical circuit is allowed to be of simple design in case of hardware, and computation speed can be improved in case of software.

Referring now to FIGS. 18(A) and 18(B), an MTF arithmetic unit 5OX included in the MTF correction unit 15X comprises an encoded data extraction unit 511, arithmetic units 512a, 512b, 513, 514, multipliers 515a, 515b, arithmetic unit 516, multipliers 517a, 517b and adder 518. These components constitute a circuit with which each of five lines allotted for the processing of the restored image data E0 to E4 (FIG. 12) respectively is provided. The MTF arithmetic unit 5OX further comprises an adder 521 and divider 522.

In the encoded data extraction unit 511, encoded data (such as the header D3CA) required for a single process of filtering are extracted from the compressed image data D3C.

In the arithmetic units 512a and 512b, the values of terms which are used in common in a block are calculated. The arithmetic unit 513 calculates the values of the terms ΣWi and ΣWj. The arithmetic unit 514 calculates the values of the terms Wi×Xi and Wj×Xj. In each of the multipliers 515a and 515b, one of two input values is multiplied by the other. The arithmetic unit 516 calculates the values of the terms ΣWi×Xi/3 and ΣWj×Xj/3. In each of the multipliers 517a and 517b, one of two input values is multiplied by the other. All the values fed to the adder 518 are summed up therein, from which the result F of calculation carried out for a line is outputted.

The results F of calculation carried out for all of the five lines are outputted. The five results F0 to F4 are summed up in the adder 521. In the divider 522, the sum ΣFk outputted from the adder 521 is divided by the sum ΣWk1 of all terms of weight factors. With these steps, corrected image data D4 is provided.

Referring now to the relationship between FIGS. 17 and 18(A), 18(B), steps 51 and 55 are implemented by the encoded data extraction unit 511, and step 52 is implemented by the arithmetic units 512a and 512b. Steps 53 and 56 are implemented by the arithmetic units 513 and 514 respectively. Step 54 is implemented by the multipliers 515a and 515b. Step 58 is implemented by the arithmetic unit 516. Steps 59 and 60 are implemented by the adder 518. Steps 61 and 62 are implemented by the adder 521.

Comparison of the MTF arithmetic unit 5OX shown in FIGS. 18(A) and 18(B) with the expansion unit 40 and MTF arithmetic unit 50 shown in FIGS. 11 and 12 respectively will reveal that the former is simpler in construction to such an extent as to be constituted by a one-chip semiconductor device.

Fifth Embodiment

The need of a large-sized digital filter for obtaining the desired high resolution during image correction and for enabling the characteristics to be kept constant as long as the spatial frequency remains unchanged has induced the present inventors to provide an MTF correction unit 15F which is the fifth embodiment of the invention. FIGS. 24(A), 24(B), and 25(A), 25(B) will afford a better understanding of the reason for the need of a large-sized digital filter for the aforesaid purposes.

FIGS. 24(A) and 24(B) provide diagrammatic illustrations of digital filters 51a and 51b which are the size of 5×5 and 7×7 respectively.

Figure 25:
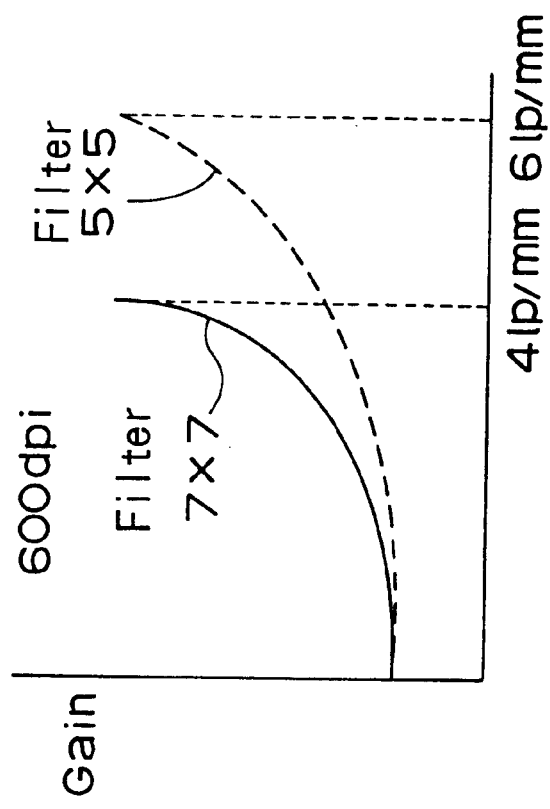
FIG. 25(A) shows frequency characteristic curves obtained when a document is read with a resolution of 400 dpi.
FIG. 25(B) shows frequency characteristic curves obtained when a document is read with a resolution of 600 dpi.
Figure 25:
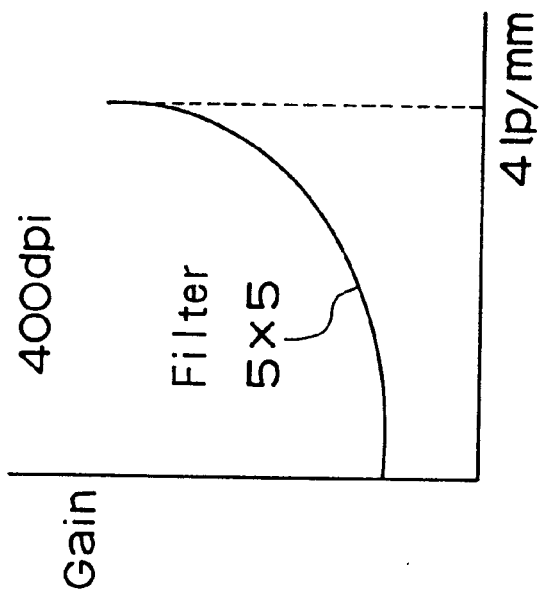

FIG. 25(A) shows a frequency characteristic curve obtainer when the digital filter 51a of the size of 5×5 is used for reading a document with a resolution of 400 dpi. The gain of the digital filter 51a with respect to the direct-current component is 1 and increases as the frequency is increased toward the Nyquist frequency which is the half of a sampling frequency.

FIG. 25(B) shows frequency characteristic curves obtained when the digital filters 51a and 51b of the size of 5×5 and 7×7 respectively are used for reading a document with a resolution of 600 dpi. As will be appreciated, the frequency characteristic curve obtained from the digital filter 51b of the size of 7×7 is similar to that obtained from the digital filter 51a of the size of 5×5 used for reading a document with a resolution of 400 dpi.

As has been noted, in order to obtain an effect of MTF correction with a resolution of 600 dpi similar to that obtainable with a resolution of 400 dpi, it is necessary to use a digital filter 51b of the size of 7×7.

This means that a large-sized digital filter is needed for obtaining the desired high resolution during image correction and for enabling the characteristics to be kept constant as long as the spatial frequency remains unchanged. High resolution necessitates a large number of lines in the FIFO memory 30 and an increase in the storage capacity thereof. However, in order to avoid the necessity of increasing the storage capacity, the fifth embodiment contemplates raising the aforesaid compressibility CR and thereby decreasing the storage capacity required per line.

Figure 20:
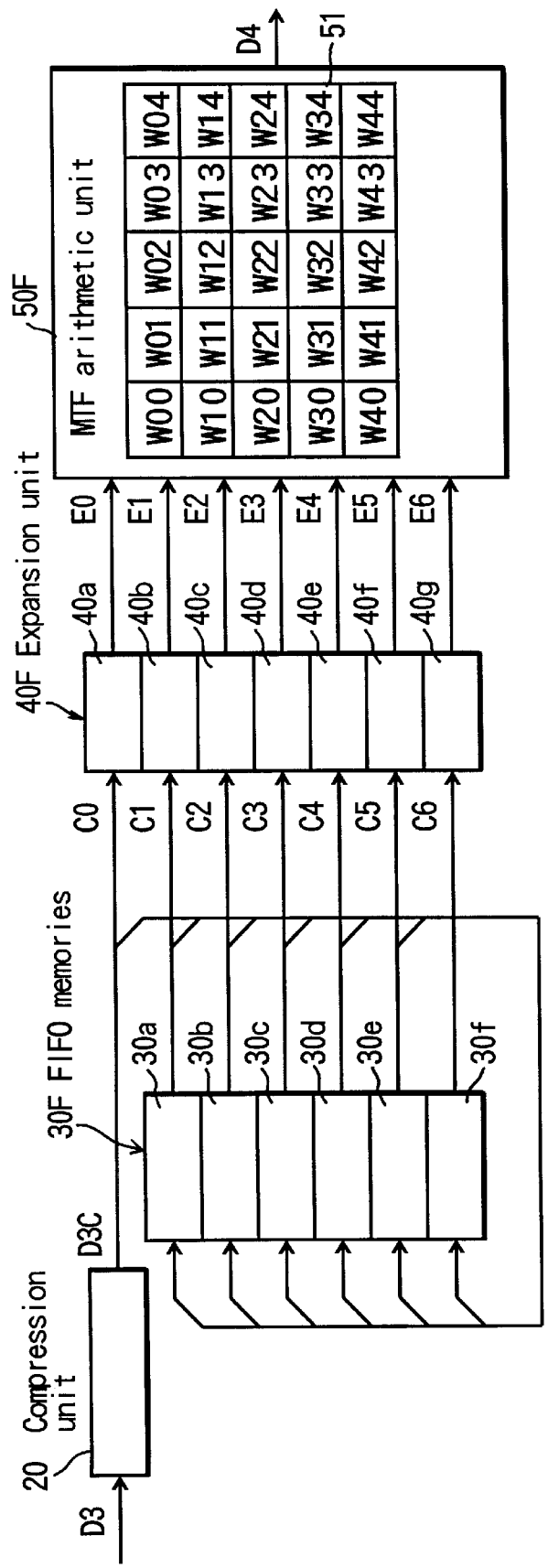
FIG. 20 is a block diagrammatic representation of an MTF correction unit which is the fifth embodiment of the invention.

Referring now to FIG. 20, the MTF correction unit 15F includes an MTF arithmetic unit 50F, in which the size of the digital filter 51 is changed in accordance with the desired resolution of the image data D3. Compressibility CR and the internal connection of the FIFO memory 30F are also changed accordingly.

In this embodiment, the compressibility CR is set to 1 and ½ when the desired resolution is 400 and 600 dpi respectively.

Figure 22:
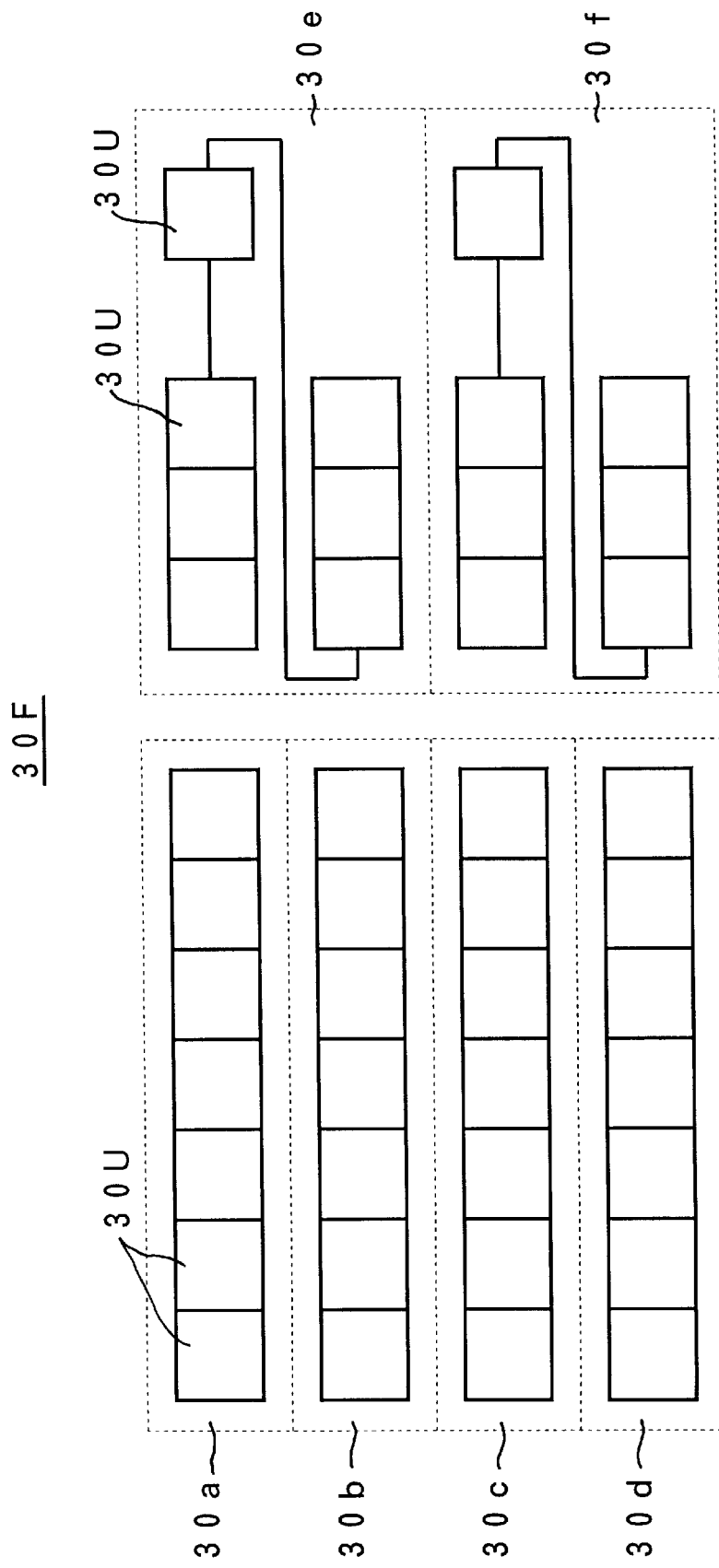
FIG. 22 is a diagrammatic view showing the FIFO memories connected to each other when a document is to be read with a resolution of 400 dpi.
Figure 23:
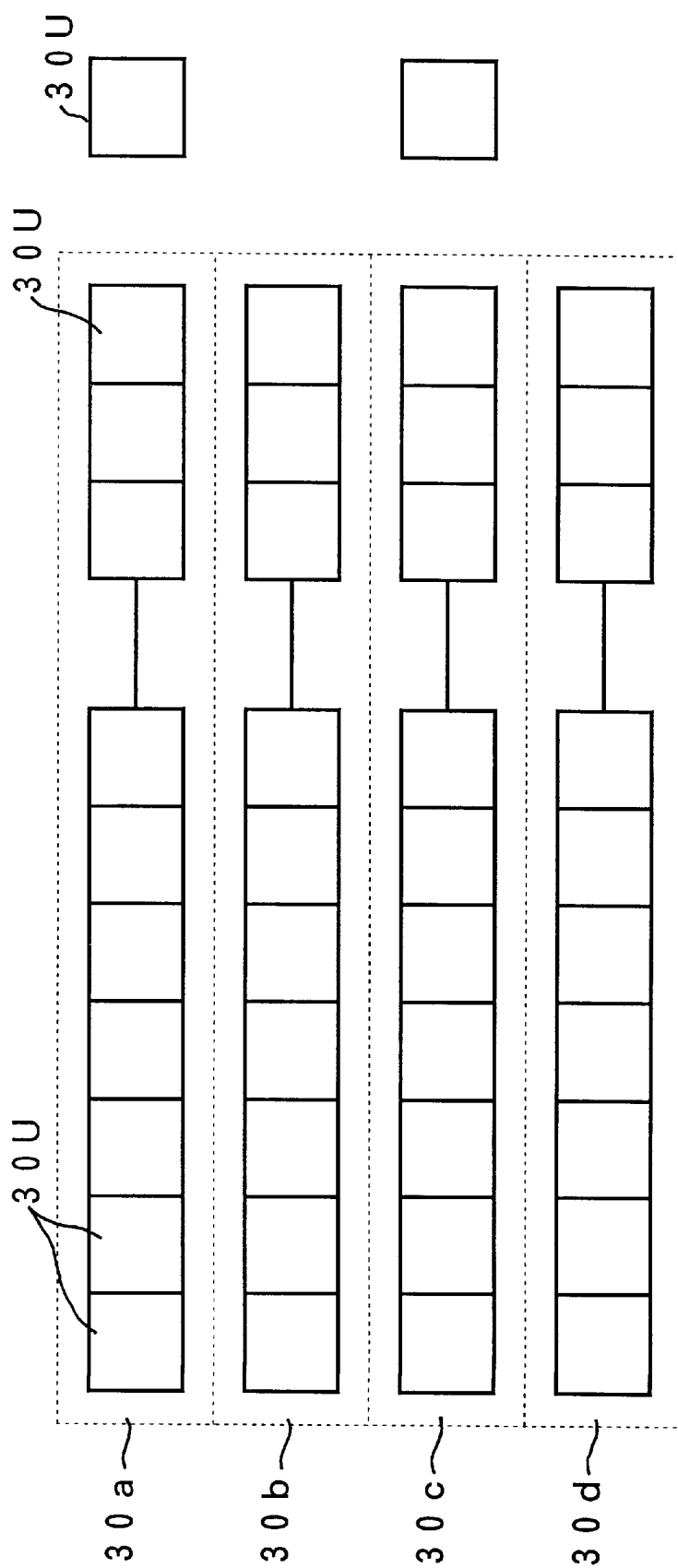
FIG. 23 is a diagrammatic view showing the FIFO memories connected to each other when a document is to be read with a resolution of 600 dpi.

As shown in FIGS. 22 and 23, the FIFO memory 30F consists of 42 submemories 30U, each of which has a storage capacity of 512 bytes. Consequently, the total storage capacity of the FIFO memory 30F amounts to 21,504 bytes.

Figure 21:
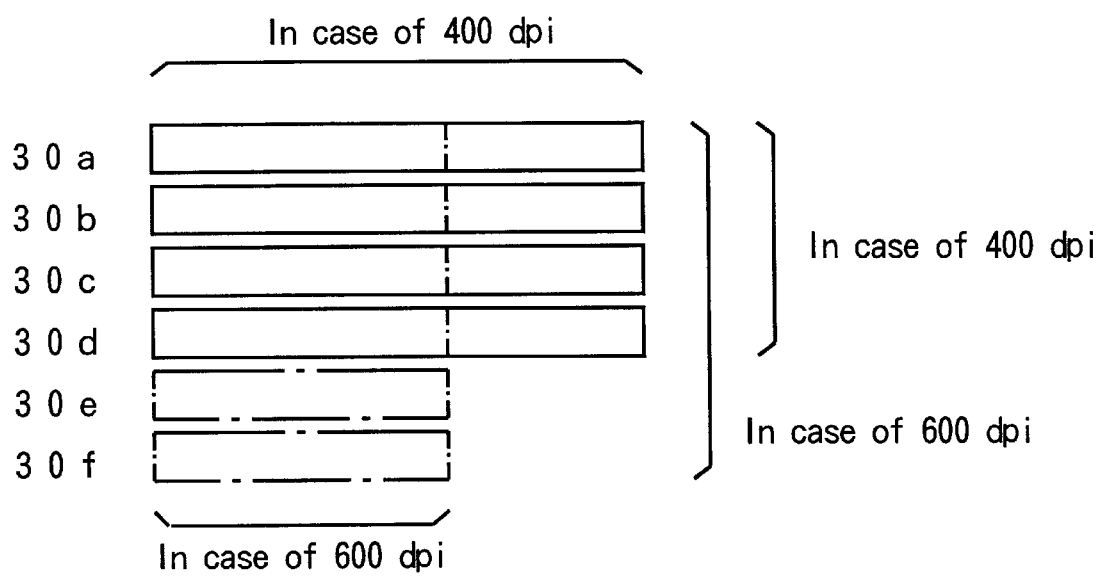
FIG. 21 is a view useful in understanding the manner in which FIFO memories are used.

As shown in FIGS. 21 to 23, the internal connection of the FIFO memory 30F is changed in accordance with the desired resolution of the image data D3, although the total storage capacity of the FIFO memory 30F is allowed to remain unchanged. This is because, since the size of the digital filter 51 is changed in the MTF arithmetic unit 5OF in accordance with the desired resolution of the image data D3, it is necessary to change the number of preceding lines for which compressed image data have to be temporarily stored until compressed image data for the last line is obtained.

When the digital filter 51a of the size of 5×5 is used, image data for four lines have to be temporarily stored until image data for the fifth line is obtained. In this case, therefore, FIFO memories 30a to 30d are provided, each of which consists of 10 submemories 30U connected in series with each other. When the digital filter 51b of the size of 7×7 is used, image data for six lines have to be temporarily stored until image data for the seventh line is obtained. In this case, therefore, FIFO memories 30a to 30f are provided, each of which consists of 7 submemories 30U connected in series with each other. A change in the connection of the submemories 30U can be effected by means of an appropriate circuit element such as a logical element or an electronic switch. The reason for the difference in the number of submemories 30U needed for a line is that the compressibility CR is different and hence the storage capacity needed for a line is different.

Reference will now be specifically made to the relationship between the resolution, compressibility CR, and total storage capacity of FIFO memory 30F.

When a document printed or handwritten on a sheet of paper parallel with the longer sides of the paper which is the size of DIN A4 is read with a resolution of 400 dpi, the number of pixels per line amounts to 4,677 and hence the number of pixels for four lines amounts to 18,708. When the same document is read with a resolution of 600 dpi, the number of pixels per line amounts to 7,016 and hence the number of pixels for six lines amounts to 42,096. When the image data consist of 8 bits per pixel, the number of pixels agrees with the number of bytes. The following table illustrates the total number of bytes in the FIFO memory 30F needed for all the four or six lines under the condition of various compressibilities CR set in the compression unit 20:

| Compressibility<br>Resolution | 1 | ½ | ⅜ | 5/16 |
|---|---|---|---|---|
| 400 dpi<br>(4 lines) | 18708 | 9353 | 7016 | 5846 |
| 600 dpi<br>(6 lines) | 42096 | 21047 | 15785 | 13154 |

Thus the storage capacity needed for a line amounts to 4,677 bytes when a document is to be read with a resolution of 400 dpi and a compressibility CR of 1, and the storage capacity needed for a line amounts to 3,508 bytes when a document is to be read with a resolution of 600 dpi and a compressibility CR of ½.

FIGS. 22 and 23 are diagrammatic views showing how the aforesaid requirements for ensuring the necessary storage capacity are met. When a document is to be read with a resolution of 600 dpi, 7 submemories 30U are connected in series with each other in each of the FIFO memories 30a to 30f as shown in FIG. 22. In this case, the storage capacity per line amounts to 3,584 bytes. When a document is to be read with a resolution of 400 dpi, 10 submemories 30U are connected in series with each other in each of the FIFO memories 30a to 30d as shown in FIG. 23. In this case, the storage capacity per line amounts to 5,120 bytes.

Although a change in the storage capacity needed for a line is caused by a change in the compressibility CR, it is possible to easily cope with the first mentioned change simply by changing the connection of the submemories 30U.

As foresaid, the FIFO memory 30F consists of 42 submemories 30U, each of which has a storage capacity of 512 bytes. Consequently, the total storage capacity of the FIFO memory 30F amounts to 21,504 bytes. The fifth embodiment is concerned with changing the connection of the submemories 30U in accordance with the desired resolution of the image data D3. This changing results in changing the storage capacity per line and the number of preceding lines for which compressed image data have to be temporarily stored until compressed image data for the last line is obtained. This means that the fifth embodiment aims at the effective utilization of the total storage capacity of FIFO memory 30F.

A particular advantage obtained from the foregoing fifth embodiment of the invention resides in the fact that, in order to effect MTF correction irrespective of the desired resolution of the image data D3, the size of the digital filter 51 has only to be changed in accordance with the desired resolution of the image data D3.

While the fifth embodiment has been described particularly in connection with 42 submemories 30U, each of which has a storage capacity of 512 bytes, it will of course be apparent to those skilled in the art that this value of storage capacity may be readily replaced by other values such as 256 or 1,024 bytes and that the number of submemories 30U may depend on the size of a document, desired resolution of the image data D3, and compressibility CR. In referring to FIG. 21, it will be noted that only two examples of the desired resolution are illustrated. In place of 400 and 600 dpi, however, other values such as 800, 1,200 or 300 dpi may also be appropriate. As a modified form of the digital filter 51, a digital filter of the size of, e.g. , 3×3 or 9×9 may also be used. Various values may be used for the weight factor Wk1.

Changes in the total storage capacity of the FIFO memory 30F and the number of submemories 30U connected in series with each other may also be made in connection with the aforesaid parameters.

Sixth Embodiment

Figure 26:
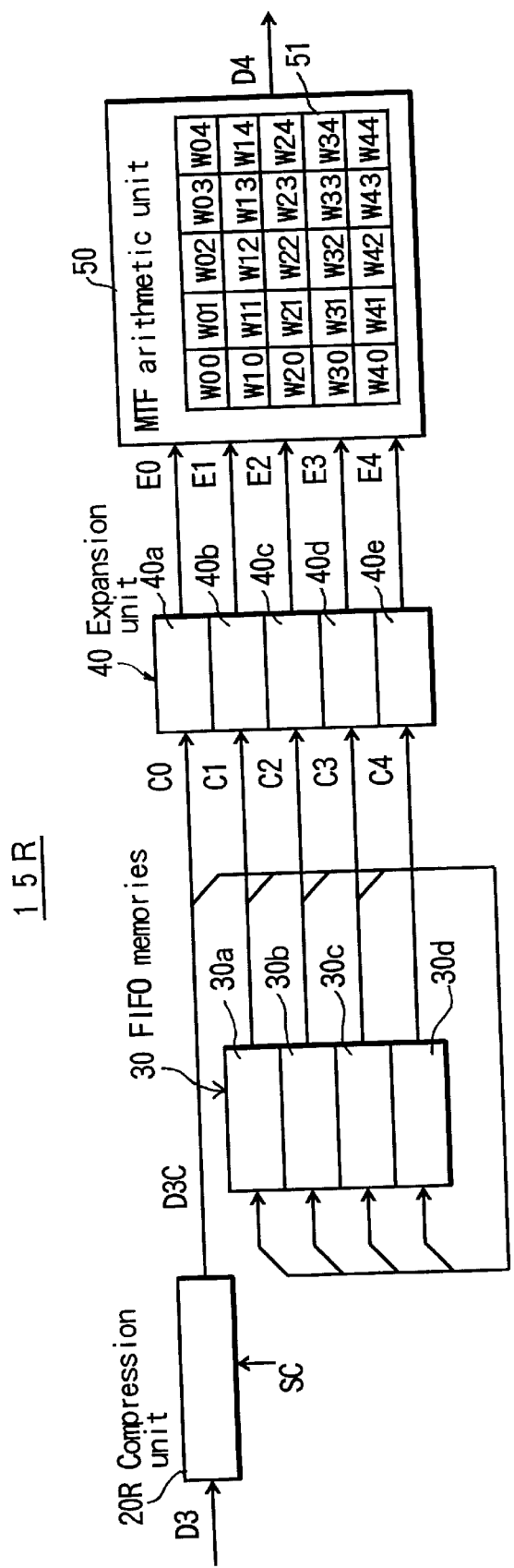
FIG. 26 is a block diagrammatic representation of an MTF correction unit which is the sixth embodiment of the invention.

FIG. 26 shows a further modified form of MTF correction unit. The MTF correction unit 15R shown therein is generally similar to the MTF correction unit 15 shown in FIG. 2 except that, in the former, a change in the compressibility CR is effected by a command SC, the value of which is a function of the number of effective pixels, a definition of which will be given hereinafter.

The MTF correction unit 15R includes a compression unit 20R, in which the compressibility CR is changed in accordance with the number of effective pixels from which the image data D3 are derived. In order to change the compressibility CR, the value of n which has been above explained is changed in response to the command SC.

Reference will now be specifically made to the relationship between the number of effective pixels, compressibility CR, and total storage capacity of FIFO memory 30.

When a document printed or handwritten on a sheet of paper parallel with the longer sides of the paper which is the size of DIN A4 is read with a resolution of 600 dpi, the number of pixels per line amounts to 7,015 and hence the number of pixels for four lines amounts to 28,060. When a document printed or handwritten on a sheet of paper parallel with the shorter sides of the paper which is the size of DIN A4 is read with a resolution of 600 dpi, the number of pixels per line amounts to 4,961. Any of these numbers of pixels is hereinafter referred to as the "number of effective pixels". When the image data consist of 8 bits per pixel, the number of effective pixels agrees with the number of bytes.

The following table illustrates the storage capacities (expressed in bytes) needed for a line under the condition that various compressibilities CR are set in the compression unit 20R and that the first mentioned document in the preceding paragraph (hereinafter referred to as the "document A") and the second mentioned document therein (hereinafter referred to as the "document B") are read with a resolution of 600 dpi:

| Compressibility | 1 | ½ | ⅜ | 5/16 |
|---|---|---|---|---|
| Document A | 7015 | 3508 | 2631 | 2129 |
| Document B | 4961 | 2481 | 1860 | 1550 |

Considering this table, it is apparent for example that the compressibility CR has to be ½ or less when a document A is to be read by means of an image processor 1 incorporating the FIFO memory 30 whose storage capacity per line is 5,120 bytes and that the compressibility CR can assume any value when a document B is to be read by means of the same image processor.

It nay further be remarked that the compressibility CR has to b 5/16 or less when a document A is to be read by means of an image processor 1 incorporating the FIFO memory 30 whose storage capacity per line is 2,560 bytes and that the compressibility CR has only to be ½ or less when a document B is to be read by means of the same image processor.

The number of effective pixels changes when the magnification is changed in reading the same document. For example, when the image data D2 is contracted in the magnification changing unit 14 shown in FIG. 1, the number of effective pixels decreases in accordance with the magnification (i.e. reduction ratio) MR.

The following table illustrates the storage capacities (expressed in bytes) needed for a line under the condition that various magnifications MR and compressibilities CR are set in the magnification changing unit 14 and the compression unit 20R respectively and that the document A is read with a resolution of 600 dpi:

| Compressibility | 1 | ½ | ⅜ | 5/16 |
|---|---|---|---|---|
| MR = 1 | 7015 | 3508 | 2631 | 2192 |
| MR = ½ | 3507 | 1754 | 1315 | 1096 |
| MR = ¼ | 1754 | 877 | 658 | 548 |

Considering this table, it is apparent for example that the compressibility CR has to be ½ or less when the document is to be read with a magnification MR of 1 by means of an image processor 1 incorporating the FIFO memory 30 whose storage capacity per line is 5,120 bytes and that the compressibility CR can assume any value when the document is to be read by means of the same image processor with a magnification MR of ½ or ¼.

It may further be remarked that the compressibility CR has to be 5/16 or less when the document is to be read with a magnification MR of 1 by means of an image processor 1 incorporating the FIFO memory 30 whose storage capacity per line is 2,560 bytes, that the compressibility CR has only to be ½ or less when the document is to be read by means of the same image processor with a magnification MR of ½, and that the compressibility CR can assume any value when the document is to be read by means of the same image processor with a magnification MR of ¼.

The closer the compressibility CR is to 1, the less deteriorated the picture quality is. It is desirable, therefore, to bring the compressibility CR close to 1 as far as circumstances permit.

In this embodiment, the compressibility CR as close as possible to 1 is set in the compression unit 20R in accordance with the storage capacity per line of the FIFO memory 30. A change of setting is effected by a command SC, the value of which is a function of the enlargement ratio MR or the number of effective pixels.

As the value of the command SC, it is possible to use the number of effective pixels per se, magnification MR, compressibility CR, value of n, or a code having relevance to any of these parameters.

Seventh Embodiment

The MTF correction unit 15M shown in FIG. 27 differs from the previously described embodiments in the fact that the former is provided with a magnification changing unit 14M at the output side thereof in addition to the magnification changing unit 14 (FIG. 1) provided at the input side thereof. The functions performed by the magnification changing units 14 and 14M are to contract and enlarge the image data respectively.

The MTF correction unit 15M has an identical construction with the MTF correction unit 15R shown in FIG. 26. As the value of the command SC to be given to the compression unit 20R, magnification MR to be set in the magnification changing unit 14M or information which undergoes variation in connection therewith may be used as a further alternative to the aforesaid.

When the image data D4 is to be enlarged in the magnification changing unit 14M, the number of effective pixels to be processed in the MTF correction unit 15M decreases in accordance with the magnification (i.e. enlargement ratio) MR. For example, when the image data D4 is to be twice enlarged in the magnification changing unit 14M, the number of effective pixels to be processed in the MTF correction unit 15M is reduced to half.

The following table illustrates the storage capacities (expressed in bytes) needed for a line under the condition that various magnifications MR and compressibilities CR are set in the magnification changing unit 14M and the compression unit 20R respectively and that the document A is read with a resolution of 600 dpi:

| Compressibility | 1 | ½ | ⅜ | 5/16 |
|---|---|---|---|---|
| MR = 1 | 7015 | 3508 | 2631 | 2192 |
| MR = 2 | 3507 | 1754 | 1315 | 1096 |
| MR = 4 | 1754 | 877 | 658 | 548 |

Considering this table, it is apparent for example that the compressibility CR has to be ½ or less when the document is to be read with a magnification MR of 1 by means of an image processor 1 incorporating the FIFO memory 30 whose storage capacity per line is 5,120 bytes and that the compressibility CR can assume any value when the document is to be read by means of the same image processor with a magnification MR of 2 or 4.

It may further be remarked that the compressibility CR has to be 5/16 or less when the document is to be read with a magnification MR of 1 by means of an image processor 1 incorporating the FIFO memory 30 whose storage capacity per line is 2,560 bytes, that the compressibility CR has only to be ½ or less when the document is to be read by means of the same image processor with a magnification MR of 2, and that the compressibility CR can assume any value when the document is to be read by means of the same image processor with a magnification MR of 4.

In brief, the storage capacity needed for a line when the document is to be read with an enlargement ratio MR of 2 or 4 set in the magnification changing unit 14M is equal to the storage capacity needed for a line when the document is to be read with a reduction ratio MR of ½ or ¼ set in the magnification changing unit 14 shown in FIG. 1.

In this embodiment, the compressibility CR as close as possible to 1 is set in the compression unit 20R in accordance with the storage capacity per line of the FIFO memory 30. A change of setting is effected by a command SC, the value of which is a function of the enlargement ratio MR or the number of effective pixels. The compressibility CR as close as possible to 1 serves to minimize noise interference which may result from the expansion of the compressed image data D3C.

FIG. 28(A), FIG. 28(B), and FIG. 28(C) provide tables in which the relationships between the compressibility CR to be selected and the storage capacity per line of the FIFO memory 30 are given under the condition that the document A is read with a resolution of 600 dpi. In FIG. 28(A), the compressibility CR to be selected under the aforesaid condition is compared with that to be selected under the condition that the document B is read with the same resolution. In FIGS. 28(B) and 28(C), the reduction ratio MR and the enlargement ratio MR respectively undergo variation.

In the magnification changing units 14 and 14M, magnification is changed by various methods well known in the art as conventional, such as subsample coding, interpolation or watering.

In addition to the aforesaid minimization of noise interference, further advantages obtainable from this embodiment are the minimized deterioration of picture quality and the effective utilization of the total storage capacity of FIFO memory 30.

Eighth Embodiment

Figure 29:
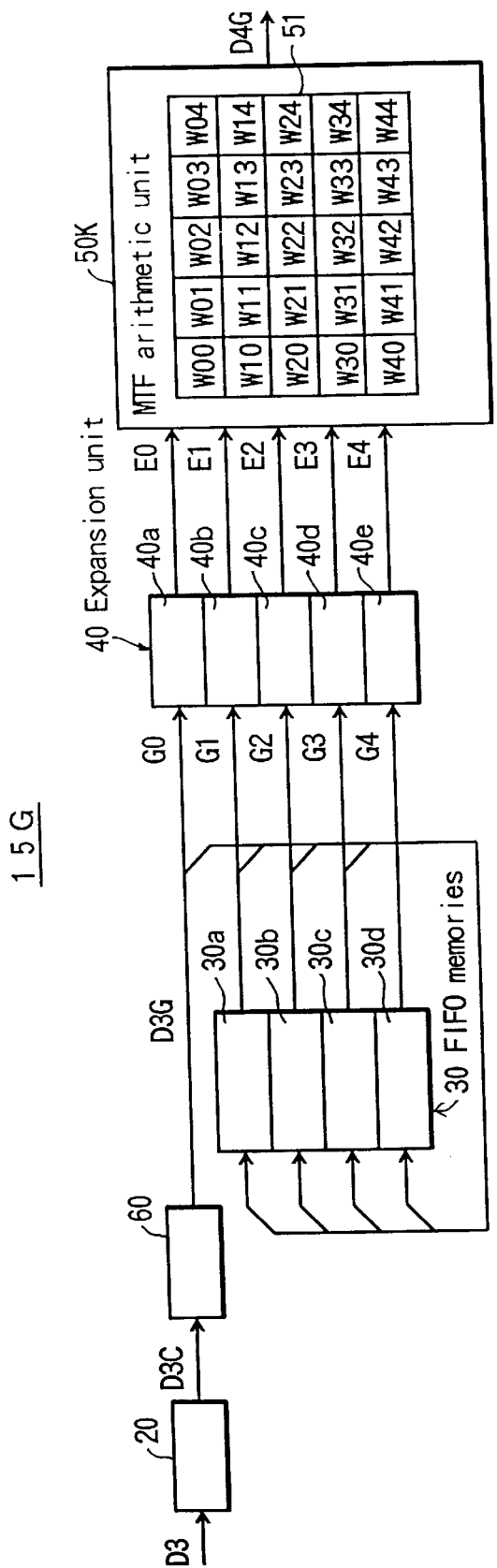
FIG. 29 is a block diagrammatic representation of an MTF correction unit which is the eighth embodiment of the invention.

FIG. 29 shows a further modified form of MTF correction unit. The MTF correction unit 15G shown therein is generally similar to the MTF correction unit 15 shown in FIG. 2 except that the former subjects the image data not only to MTF correction but also to γ correction and is provided with an encoded data correction unit 60 at the output side of the compression unit 20.

The encoded data correction unit 60 corresponds to "an image correcting section" in claim 18.

In the encoded data correction unit 60, the value of the dynamic range LD forming a part of the headder D3CA contained in the compressed image data D3C is corrected in accordance with the kind of the image. The corrected dynamic range LD' is given by

LD'=LD+BS where BS=bias

Figure 30:
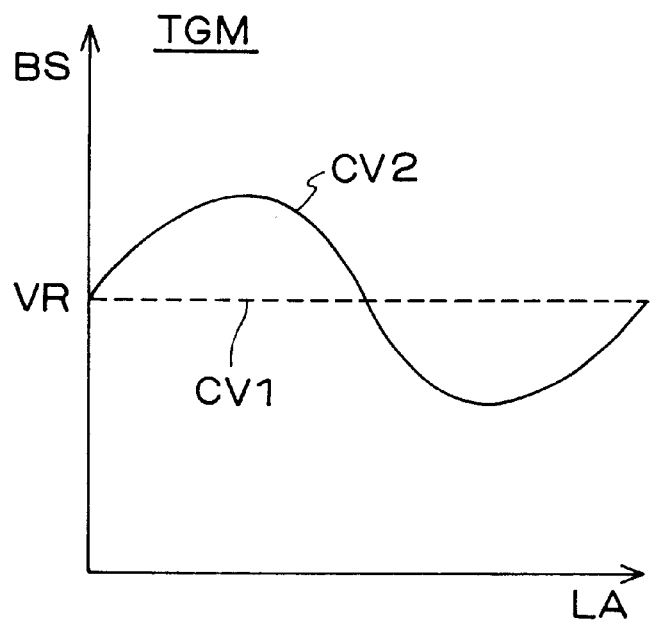
FIG. 30 provides an example of $\gamma$ correction curves for use therein.

When an image of a photograph is involved, the bias BS assumes either 0 or some other value which is a function of the dynamic range LD. When an image of characters is involves the bias BS assumes a value which is a function of the average value LA. In FIG. 30, the bias BS is plotted on an ordinate against the average value LA on an abscissa so as to provide a γ correction curve TGM.

Figure 31:
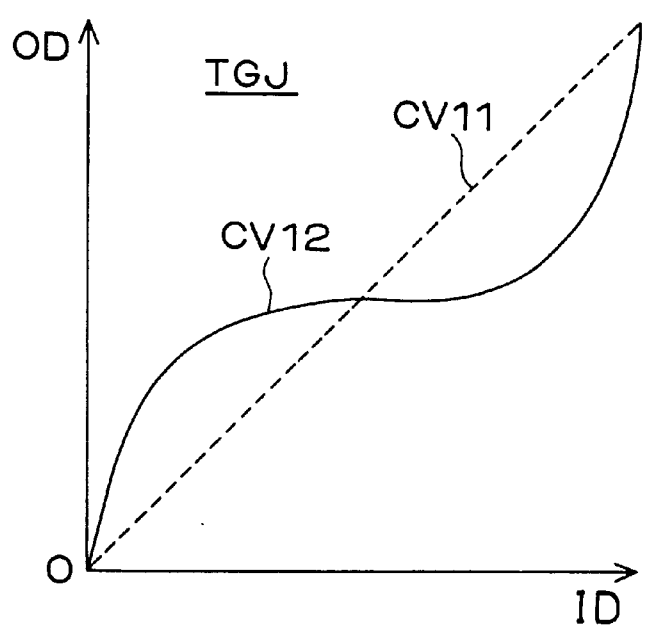
FIG. 31 provides an example of $\gamma$ correction curves which have previously been used.

FIG. 31 provides a γ correction curve TGJ which has previously been used for finding desirable output density 0D from input density ID. It is most common to use a linear graph such as a straight line CV11 for a shaded image such as a photograph. On the other hand, in order to improve a contrast in low-density portions, it is most common to use an S-shaped graph such as a curve CV12 for an edgy image such as characters.

Referring again to FIG. 30, a straight line CV1 and a curve CV2 are used for correcting the dynamic ranges LD for the images of a photograph and characters respectively. Given an average value LA, it follows that the bias BS assumes a reference value VR represented by the straight line CV1. The reference value VR is set in accordance with the size of the dynamic range LD. The curve CV2 is obtained from mapping a difference between the straight line CV11 and the curve CV12 in FIG. 31 with respect to the straight line CV1. A switchover from the straight line CV1 to the curve CV2 and vice versa is automatically made in response to a switchover made from the photograph mode to the character mode and vice versa.

When an image of characters is involved, the bias BS obtained from the γ correction curve TGM is added to the dynamic range LD. Thereby the contrast is improved as compared with the case where the image data is subjected to ordinary γ correction. However, when an image of a photograph is involved, it is desirable to use the straight line CV11 shown in FIG. 31. Therefore, the reference value VR is adjusted in accordance with the size of the dynamic range LD, e.g. in accordance with the value of $LD/LD_{max}$. This adjustment has the effect of bringing the γ correction curve TGM close to the linear graph when the dynamic range LD is large, and bringing it close to the S-shaped graph when the dynamic range LD is small.

The dynamic range LD obtained from the compression unit 20 is used in the encoded data correction unit 60. This important facet of the eighth embodiment obviates the necessity of providing an independent or complementary circuit for detecting and/or processing the dynamic range LD. The electrical circuit to be intrinsically provided in the encoded data correction unit 60 can be of simple design, because the only task to be accomplished thereby is that the bias BS obtained from the γ correction curve TGM should be added to the dynamic range LD.

In the embodiments described, various values may be used as the floating threshold values L1, LA and L2 (FIG. 6) for quarterization. With respect to equation (1), other values may be substituted for Xk than those herein shown and described. For example, instead of 1 and 2 as the value of Xk, it is also possible to use $15/16$ and $33/16$ respectively. It follows that E=LA−3LD/16 instead of E=LA−LD/6

E=LA+3LD/16 instead of E=LA+LD/6

While this invention has been described particularly in connection with MTF correction, it will of course be apparent to those skilled in the art that this invention may be applied also to other kind of image correction.

The method of compression disclosed in U.S. Pat. No. 5,307,177 is applicable to this invention. Furthermore, while the method of compression in accordance with this invention has been described particularly in connection with detecting a maximum value MAX (FIG. 6) and a minimum value MIN in each block, it will of course be apparent to those skilled in the art that they may be detected from among a plurality of serially arranged blocks.

This method of compression is more fully described in Japanese Laid Open Patent Application No. 63-155972.

It is also within the scope of this invention to combine one of the foregoing embodiments with another. Furthermore, changes in the construction and the shape of several parts, as well as in the data processing system design, may be made without departing from the nature and principle of the invention.

What is claimed is:

1. An image processing device comprising:
    a compressor for compressing a plurality of sets of image data received from a data source and for outputting a plurality of sets of thus compressed image data;
    a controller for changing a compression ratio of the compressor in accordance with image data attributes, wherein at least one of said image data attributes is selected from a group consisting of a magnification ratio and a size of an image;
    a buffer section including a memory for storing at least one set of compressed image data, said buffer section being capable of synchronizing transfer of the plurality of sets of compressed image data including the at least one set of compressed image data stored in said memory, said memory including N sets of FIFO (First-In First-Out) memories for storing the at least one set of compressed image data, wherein N is a positive integer; and
    an image processing section for receiving the plurality of sets of compressed image data synchronized by said buffer section, and for receiving a set of image data directly from said data source, said image processing section including:
        an expander for expanding the plurality of sets of compressed image data; and
        a correction circuit for refereeing the resulting plurality of sets of expanded image data and the set of image data which is directly received from the data source, said image processing section being capable of executing a predetermined process on the plurality of sets of expanded image data and on the set of image data which is directly received from the data source.

2. An image processing device as defined in claim 1, wherein said image processing section executes a correction of modulation transfer function on the plurality of sets of expanded image data and on the set of image data which is directly received from the data source.

3. An image processing device as defined in claim 1, wherein the image data attributes include a resolution of image data.

4. An image processing device as defined in claim 1, wherein the image data attributes include a magnification ratio.

5. An image processing device as defined in claim 1, wherein the image data attributes include a size of an image.

6. An image processing device comprising:
a compressor for compressing a plurality of sets of image data received from a data source and for outputting a plurality of sets of thus compressed image data, and for compressing a single set of image data and for outputting a corresponding single set of thus compressed image data as a direct set of compressed image data;
a buffer section including a memory for storing at least one set of compressed image data of said plurality of sets of compressed image data, said buffer section being capable of synchronizing transfer of the plurality of sets of compressed image data including the at least one set of compressed image data stored in said memory, said memory including N sets of FIFO (First-In First-Out) memories for storing the at least one set of compressed image data, wherein N is a positive integer; and
an image processing section for receiving the plurality of sets of compressed image data synchronized by said buffer section, and for receiving the direct set of compressed image data directly from said compressor, said image processing section including an expander for expanding the plurality of sets of compressed image data, synchronized by said buffer section, and for expanding the direct set of compressed image data directly received from said compressor to provide a direct set of expanded image data, said image processing section being capable of executing a predetermined process on the plurality of sets of compressed image data and on the direct set of compressed image data.

7. An image processing device as defined in claim 6, wherein said image processing section further includes a correction circuit for refereeing the resulting plurality of sets of thus expanded image data received from said expander and the direct set of expanded image data received from said expander.

8. An image processing device as defined in claim 7, wherein said image processing section executes a correction of modulation transfer function on the plurality of sets of expanded image data received from said expander and on the direct set of expanded image data received from said expander.

9. An image processing device as defined in claim 6, wherein said image processing section executes a correction of modulation transfer function on the plurality of sets of expanded image data and on the direct set of expanded image data.

10. An image processing device as defined in claim 6, wherein compressibility, defined by a compression ratio, is varied on the basis of input data.

11. An image processing device as defined in claim 10, wherein the input data includes a resolution of the image data.

12. An image processing device as defined in claim 10, wherein the input data includes a magnification ratio.

13. An image processing device as defined in claim 10, wherein the input data includes a size of an image.

14. An image processing device as defined in claim 6, wherein said compressor executes a GBTC (Generalized Block Truncation Coding) process on the image data.

15. An image processing device as defined in claim 6, wherein said compressor includes an image correcting section for executing a predetermined image correction process on the plurality of sets of compressed image data and on the direct set of compressed image data.

16. An image processing device as defined in claim 15, wherein said image correcting section executes a gamma correction on the plurality of sets of compressed image data and on the direct set of compressed image data.

17. An image processing device as defined in claim 15, wherein said compressor executes a GBTC (Generalized Block Truncation Coding) process on the image data.

18. An image processing device as defined in claim 15, wherein said image processing section executes a correction of modulation transfer function on the plurality of sets of expanded image data and on the direct set of expanded image data.

19. A method of processing image data, comprising the steps of:
compressing a plurality of sets of image data received from a data source, wherein a GBTC (Generalized Block Truncation Coding) process is executed on the plurality of sets of image data;
synchronizing transfer of the plurality of sets of thus compressed image data thereby parallelly transferring the plurality of sets of compressed image data;
receiving the thus synchronized plurality of sets of compressed image data;
receiving a set of image data directly from said data source;
refereeing the thus received synchronized plurality of sets of compressed image data and the set of image data thus received directly from said data source; and
executing a predetermined process on the thus refereed plurality of sets of compressed image data and the set of image data received directly from said data source;
wherein the predetermined process comprises the steps of:
expanding compressed image data; and
executing an image correction process on the thus expanded image data and the set of image data received directly from said data source.

20. A method as defined in claim 19, further comprising the step of:
outputting the plurality of sets of compressed image data serially,
wherein the step of synchronizing transfer of the plurality of sets of thus compressed image data synchronizes the plurality of sets of compressed image data thus outputted serially.

21. A method as defined in claim 19, wherein the step of synchronizing transfer of the plurality of sets of thus compressed image data is executed using a memory.

22. A method as defined in claim 21, wherein said memory includes N sets of FIFO (First-In First-Out) memories, each of the N sets of FIFO memories having a capacity of one set of the image data.

23. An image processing device comprising:
a compressor for compressing a plurality of sets of image data received from a data source and for outputting a plurality of sets of thus compressed image data;

a controller for changing a compression ratio of the compressor in accordance with image data attributes, wherein at least one of said image data attributes is selected from a group consisting of a magnification ratio and a size of an image;

a buffer section including a memory for storing at least one set of compressed image data, said buffer section being capable of synchronizing transfer of the plurality of sets of compressed image data including the at least one set of compressed image data stored in said memory; and an image processing section for receiving both the plurality of sets of compressed image data synchronized by said buffer section and a set of image data directly from said data source, said image processing section including:

an expander for expanding the plurality of sets of compressed image data, and an aligning unit for aligning the thus expanded plurality of sets of compressed image data and the set of image data which is directly received from said data source, said image processing section being capable of executing a predetermined process on the thus expanded plurality of sets of compressed image data and the set of image data which is directly received from the data source.

24. An image processing device as defined in claim 23, wherein the image data attributes include a resolution of image data.

25. An image processing device as defined in claim 23, wherein the image data attributes include a magnification ratio.

26. An image processing device as defined in claim 23, wherein the image data attributes include a size of an image.

27. A method of processing image data, comprising the steps of:

compressing a plurality of sets of image data from a data source;

compressing a single set of image data from said data source, thereby creating a direct set of compressed image data;

synchronizing transfer of the plurality of sets of thus compressed image data thereby transferring the plurality of sets of compressed image data;

receiving the thus synchronized plurality of sets of compressed image data;

receiving the direct set of compressed image data;

aligning the thus received synchronized plurality of sets of compressed image data and the thus received direct set of compressed image data;

expanding the thus aligned synchronized plurality of sets of compressed image data and the direct set of compressed image data; and executing a predetermined process on the thus expanded plurality of sets of image data and on the thus expanded direct set of image data.

28. A method as defined in claim 27, wherein said step of compressing a plurality of sets of image data includes executing a second predetermined image correction process on the thus compressed plurality of sets of compressed image data, and wherein said step of compressing a single set of image data includes executing the second predetermined image correction process on the thus compressed direct set of compressed image data.

29. A method as defined in claim 28, wherein the second predetermined image correction process is a gamma correction.

30. A method as defined in claim 28, wherein a GBTC (Generalized Block Truncation Coding) process is executed in the step of compressing a plurality of sets of image data and in the step of compressing a single set of image data.

31. An image processing device comprising:

a compressor for compressing image data representing a plurality of lines;

a controller for changing a compression ratio of the compressor in accordance with the number of lines;

a buffer section including a plurality of sets of memory for storing image data compressed by the compressor such that each set of memory stores compressed image data representing one of the plurality of lines;

an output section for expanding the compressed image data, and outputting the thus expanded image data such that image data representing each of the plurality of lines is synchronously outputted; and an image processing section for performing an image correction process on the image data outputted from the output section.

32. An image processing device as claimed in claim 31, wherein the number of lines is determined based on a resolution of the image data.

33. An image processing device comprising:

a compressor for compressing image data representing a plurality of lines;

a controller which changes a compression ratio of the compressor in accordance with a number of pixels in one line;

a buffer section including a plurality of sets of memory for storing image data compressed by the compressor such that each set of memory stores compressed image data representing one of the plurality of lines;

an output section for expanding the compressed image data, and outputting the thus expanded image data such that image data representing each of the plurality of lines is synchronously outputted; and an image processing section for performing an image correction process on the image data outputted from the output section.

34. An image processing device comprising:

a compressor for compressing image data representing a plurality of lines, wherein the compressor divides the image data into blocks of n pixels and performs a process so that average value data, indicating an average value of the image data of a respective block, dynamic range data, indicating a dynamic range of a respective block, and encoded data, indicating a density position of the image data of each pixel in a respective block, are included in the compressed image data;

a buffer section including a plurality of sets of memory for storing image data compressed by the compressor such that each set of memory stores compressed image data representing one of the plurality of lines;

an output section for outputting the image data stored in the sets of memory such that image data representing each of the plurality of lines is synchronously outputted; and an image processing section for simultaneously performing an image correction process and an expanding process on the image data outputted from the output section.

35. An image processing device as claimed in claim 34, wherein the image processing section can perform an image correction process for digital filtering based at least in part on expanded image data and a weight factor.

36. An image processing device comprising:
- a compressor for compressing image data representing a plurality of lines, wherein the compressor divides the image data into blocks of n pixels and performs a process so that average value data indicating an average value of image data of a respective block, and dynamic range data, indicating a dynamic range of a respective block, are included in the compressed image data;
- a buffer section including a plurality of sets of memory for storing image data compressed by the compressor such that each set of memory stores compressed image data representing one of the plurality of lines;
- an output section for outputting the image data stored in the sets of memory such that image data representing each of the plurality of lines is synchronously outputted; and
- an image processing section for simultaneously performing an image correction process and an expanding process on the image data outputted from the output section;
  - wherein the compressor includes an image correcting section for correcting an image by adding to the dynamic range data a bias value based on the dynamic range data and the average value data.

* * * * *